US007172506B2

(12) United States Patent
Baerlocher et al.

(10) Patent No.: US 7,172,506 B2
(45) Date of Patent: *Feb. 6, 2007

(54) GAMING DEVICE HAVING AWARD MODIFICATION OPTIONS FOR PLAYER SELECTABLE AWARD DIGITS

(75) Inventors: Anthony J. Baerlocher, Reno, NV (US); Cari L. Blomquist, Reno, NV (US); Darren Maya, Reno, NV (US); Robert N. Silva, Reno, NV (US); William J. Bussick, Reno, NV (US)

(73) Assignee: IGT, Reno, NV (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/933,843

(22) Filed: Aug. 20, 2001

(65) Prior Publication Data

US 2003/0036419 A1 Feb. 20, 2003

(51) Int. Cl.

| | |
|---|---|
| ***A63F 13/00*** | (2006.01) |
| ***A63F 9/24*** | (2006.01) |
| ***G06F 17/00*** | (2006.01) |
| ***G06F 19/00*** | (2006.01) |

(52) U.S. Cl. ............................ 463/25; 463/16; 463/29; 273/138.1; 273/139

(58) Field of Classification Search .................. 463/25, 463/1, 2, 7, 9, 10, 11, 12, 13, 16, 17, 18, 19, 463/20, 21, 30, 31, 36, 37, 38; 273/138.1, 273/138.2, 139, 236, 237, 242
See application file for complete search history.

(56) References Cited

U.S. PATENT DOCUMENTS 2,743,108 A 4/1956 Sander
3,618,952 A * 11/1971 Tallarida ..................... 273/269
4,624,459 A 11/1986 Kaufman
4,695,053 A 9/1987 Vazquez, Jr. et al.
4,811,953 A * 3/1989 Jeng ........................... 273/265
4,978,129 A * 12/1990 Komeda et al. .............. 463/31
5,205,555 A 4/1993 Hamano (Continued)

FOREIGN PATENT DOCUMENTS

AU 200069612 10/2000

(Continued)

OTHER PUBLICATIONS

Wheel of Fortune Brochure written by IGT published in 1998.

(Continued)

*Primary Examiner*—Xuan M. Thai
*Assistant Examiner*—Binh-An D. Nguyen
(74) *Attorney, Agent, or Firm*—Bell, Boyd & Lloyd LLC

(57) ABSTRACT

The present invention provides a gaming device that has an award modification function for player selectable awards that may be implemented with a primary or bonus game. More specifically, the present invention provides a processor controlled gaming device that randomly generates a plurality of positions or digits of an award and enables the player to pick which position or digit receives a first randomly generated number, which digit receives a second randomly generated number, etc., until each of the positions have a number, whereby the gaming device determines the player's ultimate award. The present invention further provides a plurality of modification methods for modifying the digits of the award.

30 Claims, 11 Drawing Sheets

U.S. PATENT DOCUMENTS

| | | | | |
|---|---|---|---|---|
| 5,342,047 | A | 8/1994 | Heidel et al. | |
| 5,393,057 | A * | 2/1995 | Marnell, II | 463/13 |
| 5,456,465 | A | 10/1995 | Durham | |
| 5,580,309 | A * | 12/1996 | Piechowiak et al. | 463/16 |
| 5,700,009 | A * | 12/1997 | Meoni | 273/269 |
| 5,769,716 | A | 6/1998 | Saffari et al. | |
| 5,788,573 | A | 8/1998 | Baerlocher et al. | |
| 5,816,918 | A | 10/1998 | Kelly et al. | |
| 5,823,873 | A | 10/1998 | Moody | |
| 5,823,874 | A | 10/1998 | Adams | |
| 5,823,879 | A | 10/1998 | Goldberg et al. | |
| 5,833,536 | A | 11/1998 | Davids et al. | |
| 5,848,932 | A | 12/1998 | Adams | |
| 5,882,261 | A | 3/1999 | Adams | |
| 5,947,820 | A | 9/1999 | Morro et al. | |
| 5,980,384 | A * | 11/1999 | Barrie | 463/16 |
| 5,997,401 | A | 12/1999 | Crawford | |
| 6,004,207 | A | 12/1999 | Wilson, Jr. et al. | |
| 6,012,982 | A * | 1/2000 | Piechowiak et al. | 463/16 |
| 6,015,346 | A | 1/2000 | Bennett | |
| 6,089,976 | A | 7/2000 | Schneider et al. | |
| 6,102,798 | A | 8/2000 | Bennett | |
| 6,109,610 | A * | 8/2000 | Cherry et al. | 273/269 |
| 6,120,031 | A | 9/2000 | Adams | |
| 6,126,542 | A | 10/2000 | Fier | |
| 6,142,873 | A * | 11/2000 | Weiss et al. | 463/20 |
| 6,146,273 | A | 11/2000 | Olsen | |
| 6,155,925 | A | 12/2000 | Giobbi et al. | |
| 6,159,095 | A | 12/2000 | Frohm et al. | |
| 6,159,097 | A | 12/2000 | Gura | |
| 6,159,098 | A | 12/2000 | Slomiany et al. | |
| 6,162,121 | A | 12/2000 | Morro et al. | |
| 6,168,520 | B1 | 1/2001 | Baerlocher et al. | |
| 6,168,523 | B1 | 1/2001 | Piechowiak et al. | |
| 6,173,955 | B1 | 1/2001 | Perrie et al. | |
| 6,174,234 | B1 | 1/2001 | Seibert, Jr. et al. | |
| 6,174,235 | B1 | 1/2001 | Walker et al. | |
| 6,190,255 | B1 | 2/2001 | Thomas et al. | |
| 6,203,429 | B1 | 3/2001 | Demar et al. | |
| 6,210,279 | B1 | 4/2001 | Dickinson | |
| 6,224,482 | B1 | 5/2001 | Bennett | |
| 6,231,442 | B1 | 5/2001 | Mayeroff | |
| 6,231,445 | B1 | 5/2001 | Acres | |
| 6,234,897 | B1 | 5/2001 | Frohm et al. | |
| 6,261,177 | B1 | 7/2001 | Bennett | |
| 6,270,409 | B1 | 8/2001 | Shuster | |
| 6,283,855 | B1 | 9/2001 | Bingham | |
| 6,299,165 | B1 | 10/2001 | Nagano | |
| 6,309,300 | B1 | 10/2001 | Glavich | |
| 6,312,334 | B1 | 11/2001 | Yoseloff | |
| 6,322,309 | B1 | 11/2001 | Thomas et al. | |
| 6,328,649 | B1 * | 12/2001 | Randall et al. | 463/20 |
| 6,334,814 | B1 * | 1/2002 | Adams | 463/20 |
| 6,346,043 | B1 | 2/2002 | Colin et al. | |
| 6,347,996 | B1 | 2/2002 | Gilmore et al. | |
| 6,358,147 | B1 | 3/2002 | Jaffe et al. | |
| 6,364,767 | B1 | 4/2002 | Brossard et al. | |
| 6,394,902 | B1 * | 5/2002 | Glavich et al. | 463/20 |
| 6,398,218 | B1 | 6/2002 | Vancura | |
| 6,413,161 | B1 * | 7/2002 | Baerlocher et al. | 463/20 |
| 6,439,995 | B1 * | 8/2002 | Hughs-Baird et al. | 463/20 |
| 6,443,837 | B1 | 9/2002 | Jaffe et al. | |
| 6,589,114 | B2 * | 7/2003 | Rose | 463/20 |
| 2002/0094861 | A1 | 7/2002 | Seelig et al. | |
| 2003/0027623 | A1 | 2/2003 | Rose | |

FOREIGN PATENT DOCUMENTS

| | | | |
|---|---|---|---|
| EP | 0945837 | A2 | 9/1999 |
| EP | 0984409 | A2 | 3/2000 |
| GB | 2 366 435 | | 6/2002 |
| WO | WO 00/9732285 | | 4/1997 |
| WO | WO 97/32285 | | 9/1997 |
| WO | WO 00/12186 | | 3/2000 |
| WO | WO 00/17831 | | 3/2000 |

OTHER PUBLICATIONS

Fortune Cookie Brochure written by IGT published in 2000.

Jumble Article written by Strictly Slots published in Dec. 2000.

Jumble Website Printout written by WMS printed Mar. 21, 2001.

A Salute to Game Shows-The Price is Right-Pricing Games. Retrieved from the Internet:<http://ben-schumin.simplenet.com/game-shows/shows/price-is-right/pricing-games.htm>, Aug. 16, 2000.

Description of Let's Make a Deal Television Show written by www.ballygaming.com, printed Mar. 16, 2001.

Jazzy Jackpots Advertisement written by Atronic, published prior to Aug. 20, 2001.

Rainbow Riches 5 Linear Advertisement, written by BSCI Corporation, published prior to Aug. 20, 2001.

Sphinx Magic Advertisement, written by Atronic Casino Technology, Ltd., published 1997.

Take Your Pick-Anchor Games, written by Strictly Slots, p. 50, published Mar. 2001.

Texas Tea Advertisement written by IGT, published in 2000.

Top Dollar, Technical Brochure, pp. 1-2, written by IGT, published in 1998.

Top Dollar Advertisement written by IGT, published in 1998.

Who Dunnit Advertisement written by WMS Gaming, Inc., published Jun. 26, 2001.

Winning Bid Advertisement written by WMS Gaming, Inc., published prior to Aug. 20, 2001.

Jumble Advertisement written by WMS Gaming Inc., published prior to 2000.

Loaded Dice Advertisement written by Konami Gaming, published in 2000.

* cited by examiner

GAMING DEVICE HAVING AWARD MODIFICATION OPTIONS FOR PLAYER SELECTABLE AWARD DIGITS

CROSS REFERENCE TO RELATED APPLICATIONS

The present invention relates to the following co-pending commonly owned U.S. patent applications: "Gaming Device Having Apparatus and Method for Producing an Award Through Award Elimination or Replacement," filed on Oct. 11, 2000, Ser. No. 09/686,283, "Gaming Device Having Award Exchange Bonus Round And Method For Revealing Award Exchange Possibilities," Ser. No. 09/689,510, "Gaming Device Having Graduating Award Exchange Sequence With A Tease Consolation Sequence And An Initial Qualifying Sequence," Ser. No. 09/680,601, "Gaming Device Having Value Selection Bonus," filed on Oct. 6, 2000, Ser. No. 09/684,605, and "Gaming Device Having Player Selectable Award Digits And Award Modification Option," Ser. No. 09/934,003.

COPYRIGHT NOTICE

A portion of the disclosure of this patent document contains or may contain material which is subject to copyright protection. The copyright owner has no objection to the photocopy reproduction by anyone of the patent document or the patent disclosure in exactly the form it appears in the Patent and Trademark Office patent file or records, but otherwise reserves all copyright rights whatsoever.

DESCRIPTION

The present invention relates in general to a gaming device, and more particularly to a gaming device having award modification options for player selectable awards.

BACKGROUND OF THE INVENTION

Gaming devices currently exist with bonus rounds in which a player has one or more opportunities to choose masked bonus values from a pattern of masked values displayed to the player. When the player chooses a masked value from the pattern, the game removes the mask and either provides the player with a bonus value or terminates the bonus round with a bonus terminator. The outcome depends upon whether the player selects a value or a terminator.

In the above game, the controller of the gaming device randomly places a predetermined number of masked values and terminators in the pattern at the beginning of the bonus round and maintains the positioning until the bonus round terminates. When the player selects a masked value, the player receives the value, and the game typically displays a message that the player may continue and enables the player to select another masked award. The player then selects another masked value, and the process continues until the player selects a masked terminator. U.S. Pat. No. 6,190,255 B1, which issued on Feb. 20, 2001, and which is assigned on its face to WMS Gaming Inc., discloses a bonus game of this type.

Gaming machines also currently exist with bonus rounds in which the game selects or determines the player's award. PCT application PCT/AU97/00121 entitled, Slot Machine Game with Roaming Wild Card, having a publication date of Sep. 4, 1997, discloses an example. In this game, a slot machine having a video display contains a plurality of rotatable reels with game symbols. When the player receives a triggering symbol or combination, the game produces a bonus symbol. The bonus symbol moves from game symbol to game symbol temporarily changing the game symbol to a bonus symbol. If the change results in a winning combination, the player receives an award.

In the first known game, the "go-until" or "do-until" bonus can end quite quickly if the player selects a bonus terminator early in the bonus round. The player selects masked symbols until selecting the bonus terminator, which is immediately displayed. The player's involvement in the bonus round is thus limited. The player has no opportunity to undo or redo an undesired pick. The player has no opportunity to optimize or maximize the bonus round award. In the second known game, the game completely determines the bonus round award, and the player has no effect on the outcome.

Gaming devices provide enjoyment and excitement to the player, in part, because they may ultimately lead to a monetary award for the player. Gaming devices also provide enjoyment and excitement to the player because they are fun to play. Bonus games, in particular, provide gaming device manufacturers with the opportunity to add enjoyment and excitement to that which is already expected from a base game of the gaming device. Bonus games provide extra awards to the player and enable the player to play a game that is different than the base game.

A continuing need exists for gaming devices that provide awards in an exciting and enjoyable manner. In this respect, it is desirable to enable the player to have an impact on, or a hand in, determining the player's award. It is also desirable to enable a player to optimize an award. It is further desirable to increase the level of player interaction. Each of these features is desirable in a base or primary game and in a bonus or secondary game.

SUMMARY OF THE INVENTION

The present invention provides a gaming device that has award modification options for player selectable awards that may be implemented with a primary or bonus game. More specifically, the present invention provides a processor controlled gaming device that randomly generates a plurality of positions or digits of an award and enables the player to pick which position or digit receives a first randomly generated number, which digit receives a second randomly generated number, etc., until each of the positions have a number, whereby the gaming device determines the player's ultimate award based on the order of the number in the positions. This sequence or feature may be employed in a bonus game, in a known base or primary game or in any stand alone game.

In one embodiment, the gaming device randomly generates a number and does not disclose or reveal the number to the player. The game prompts the player to pick one of the award positions or digits. When the player selects one of the award positions or digits, the game reveals the number in the selected position or digit. The player hopes that higher numbers will be generated in positions or digits having a relatively high order of magnitude, e.g., the hundred's digit for a three digit award.

In another embodiment, the gaming device randomly generates and displays a plurality of player selectable masked numbers or selections and enables the player to place the selections or masked numbers in an order (i.e., in the positions or digits of an award). During or after the player directs the placement of the selections or masked numbers, the game reveals the numbers and the player's award.

The gaming device may be adapted to provide an equal amount of selections and digits, more selections than digits or less selections than digits. The present invention provides several different visual techniques for enabling the player to place masked numbers into the award positions or digits. In certain embodiments, the gaming device enables the player to change the order of masked numbers before revealing the player's award. When the player is certain of the desired masked number arrangement, the game reveals the numbers.

In a preferred embodiment, the player's award is the displayed value, which is the combination of the revealed numbers in the selected digits. In other embodiments, the game can multiply one or more of the digits, add one or more of the digits and/or use the face value of other digits to form some or all of the player's award.

In one bonus game embodiment, the game initially randomly generates and displays a number of inputs and prompts the player to select one of the inputs. When the player selects an input, the game generates and displays a number of masked numbers. In one embodiment, the game also displays how many numbers are to be displayed, e.g., the number "three," before displaying three masked numbers.

When this sequence is combined with the base game of slot, the initial random generation of the number of masked numbers may be replaced by the intermittent random generation of the masked numbers or selections on the reels of the slot machine. The slot game provides a secondary or jackpot award having a number of positions or digits (preferably three). As one or more players play the base slot game, they generate a required set of masked numbers and fill in the positions or digits of the jackpot award in a desired order. The game eventually reveals the masked numbers and awards the jackpot award to the player who completes the required set. It should be appreciated that the jackpot award may be progressive, e.g., incrementally built using a percentage of the player's wager.

The present invention further provides for modification of the player's award. The modification may be randomly triggered, provided as an option to the player or automatically executed based on the expected value of the current award. When randomly triggered, the gaming device in one embodiment provides a modifier upon a player's selection of a masked number or upon the player's selection of an award position or digit. That is, when the player selects an award position or digit or selects one of the selections or masked numbers, the gaming device, instead of providing or revealing a number, provides or reveals a modifier. Alternatively, the game may be adapted to randomly generate an award modifier based on some other triggering mechanism, such as the generation of a particular number or set of numbers.

When provided as an option, the player decides whether to keep the currently generated award or risk the award and let the award modification take place. In one embodiment, the gaming device automatically provides the award modification option to the player. In another alternative embodiment, the gaming device randomly determines whether or not to provide an award modification option based on the player's selection or upon another triggering event.

Several different modification sequences or methods are provided by the present invention. In one preferred embodiment, the gaming device randomly generates one of the modification methods when the player decides to modify rather than keep a generated award. The modification methods include, among others: scrambling or rearranging the digits of an original award, completely regenerating the award, adding a digit to the award, subtracting a digit from the award and multiplying the award.

In the scramble or rearrangement modification method, the processor rearranges the digits of a currently generated award. In the option embodiment, once the player chooses to modify the current award, and the game randomly generates the rearrangement option, the player is provided the rearranged award regardless of whether the award is higher or lower. In another embodiment, the game determines the expected value for the originally generated set of digits and automatically rearranges the player's award if the expected value exceeds the current award.

In the award regeneration modification method, the gaming device enables the player to replay the game and generate a new award. In the option embodiment, once the player chooses to modify the current award, and the game randomly generates the regeneration option, the player is provided the regenerated award regardless of whether the award is higher or lower.

The add a digit modification method in one embodiment adds a one's digit of five to the end of the player's current award and slides each existing digit up an order of magnitude, thus, the award 416 becomes 4165. The subtract a digit modification method in one embodiment removes the lowest number or value from the player's current award. For example, the award 416 becomes 46. The multiply modification method in one embodiment randomly selects a multiplier and multiplies the player's current award, e.g., a multiplier of three times 416.

It is therefore an advantage of the present invention to provide a gaming device that enables a player to have a direct impact on determining an award.

Another advantage of the present invention is to provide a gaming device that selectively enables the player to keep or modify an award.

A further advantage of the present invention is to randomly employ one of a number of award modification methods to provide a varied and exciting gaming device.

Yet another advantage of the present invention is to provide a gaming device that increases the level of player interaction.

Other objects, features and advantages of the invention will be apparent from the following detailed disclosure, taken in conjunction with the accompanying sheets of drawings, wherein like numerals refer to like parts, elements, components, steps and processes.

DETAILED DESCRIPTION OF THE INVENTION

Gaming Device and Electronics

Figure 1A:
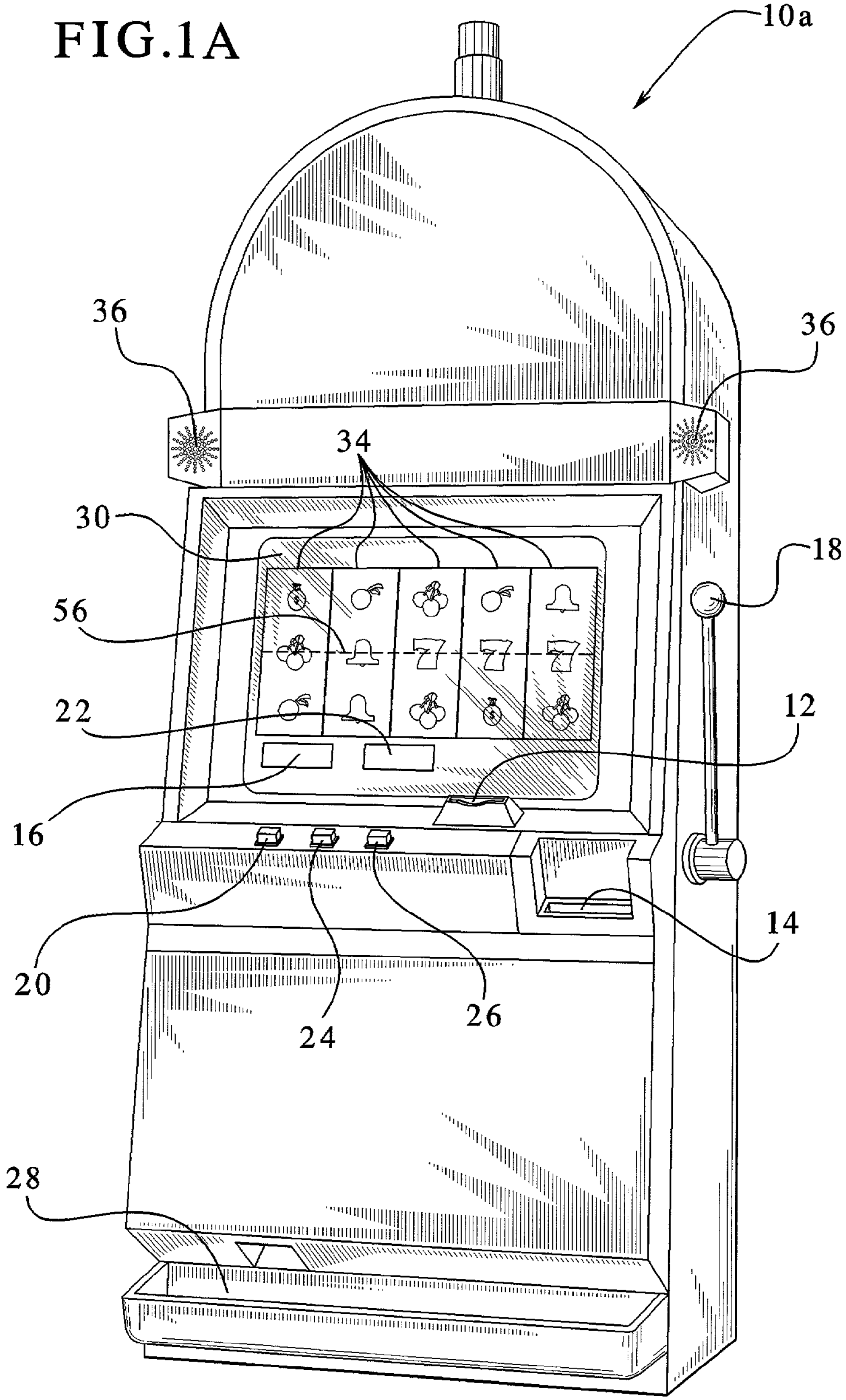
FIGS. 1A and 1B are perspective views of alternative embodiments of the gaming device of the present invention.
Figure 1B:
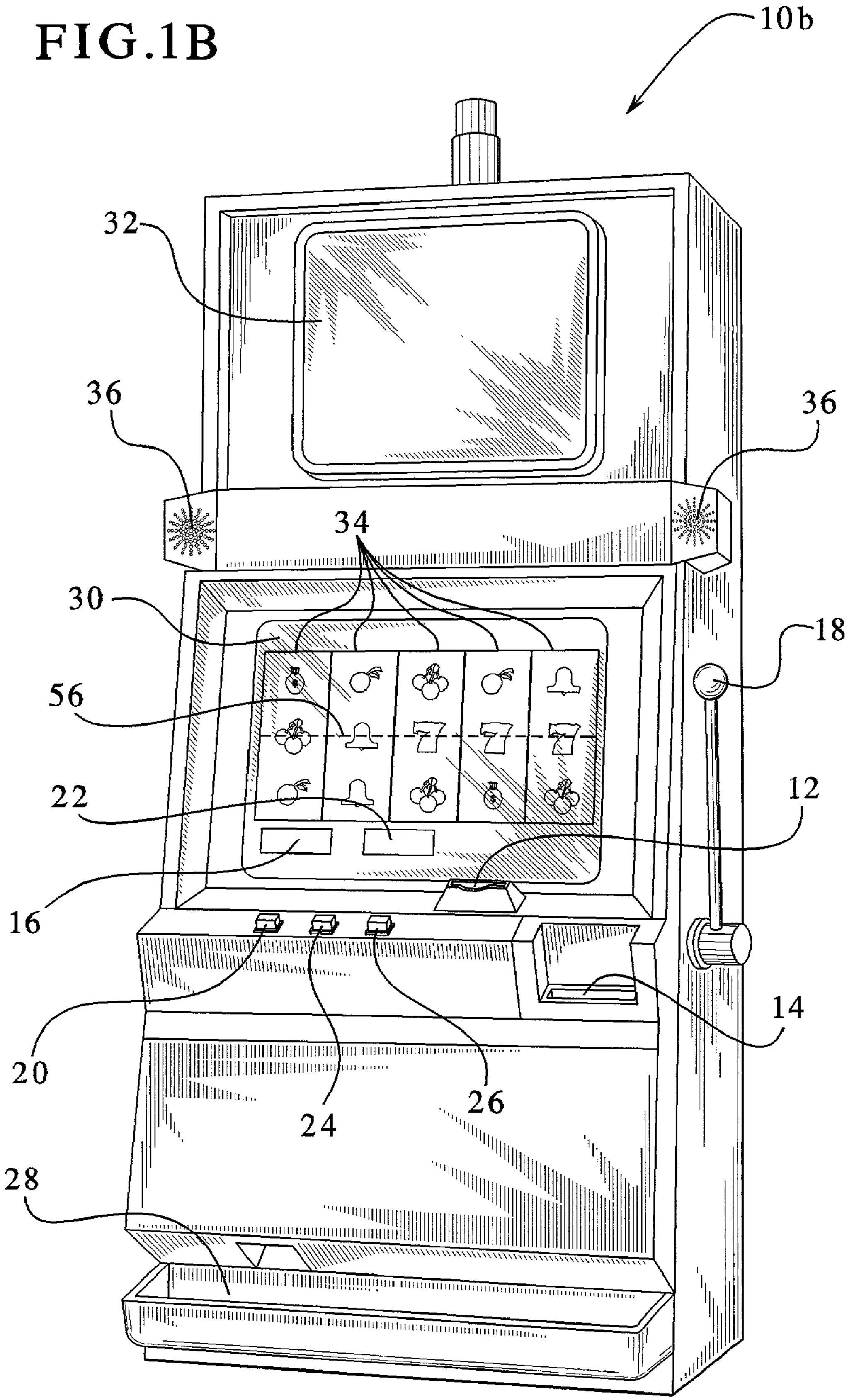

Referring now to the drawings, and in particular to FIGS. 1A and 1B, gaming device 10*a* and gaming device 10*b* illustrate two possible cabinet styles and display arrangements and are collectively referred to herein as gaming device 10. The present invention includes the game (described below) being a stand alone game or a bonus or secondary game that coordinates with a base game. When the game of the present invention is a bonus game, gaming device 10 in one base game is a slot machine having the controls, displays and features of a conventional slot machine, wherein the player operates the gaming device while standing or sitting. Gaming device 10 also includes being a pub-style or table-top game (not shown), which a player operates while sitting.

The base games of the gaming device 10 include slot, poker, blackjack or keno, among others. The gaming device 10 also embodies any bonus triggering events, bonus games as well as any progressive game coordinating with these base games. The symbols and indicia used for any of the base, bonus and progressive games include mechanical, electrical, electronic or video symbols and indicia.

In a stand alone or a bonus embodiment, the gaming device 10 includes monetary input devices. FIGS. 1A and 1B illustrate a coin slot 12 for coins or tokens and/or a payment acceptor 14 for cash money. The payment acceptor 14 also includes other devices for accepting payment, such as readers or validators for credit cards, debit cards or smart cards, tickets, notes, etc. When a player inserts money in gaming device 10, a number of credits corresponding to the amount deposited is shown in a credit display 16. After depositing the appropriate amount of money, a player can begin the game by pulling arm 18 or pushing play button 20. Play button 20 can be any play activator used by the player which starts any game or sequence of events in the gaming device.

As shown in FIGS. 1A and 1B, gaming device 10 also includes a bet display 22 and a bet one button 24. The player places a bet by pushing the bet one button 24. The player can increase the bet by one credit each time the player pushes the bet one button 24. When the player pushes the bet one button 24, the number of credits shown in the credit display 16 decreases by one, and the number of credits shown in the bet display 22 increases by one. At any time during the game, a player may "cash out" by pushing a cash out button 26 to receive coins or tokens in the coin payout tray 28 or other forms of payment, such as an amount printed on a ticket or credited to a credit card, debit card or smart card. Well known ticket printing and card reading machines (not illustrated) are commercially available.

Gaming device 10 also includes one or more display devices. The embodiment shown in FIG. 1A includes a central display device 30, and the alternative embodiment shown in FIG. 1B includes a central display device 30 as well as an upper display device 32. The display devices display any visual representation or exhibition, including but not limited to movement of physical objects such as mechanical reels and wheels, dynamic lighting and video images. The display device includes any viewing surface such as glass, a video monitor or screen, a liquid crystal display or any other static or dynamic display mechanism. In a video poker, blackjack or other card gaming machine embodiment, the display device includes displaying one or more cards. In a keno embodiment, the display device includes displaying numbers.

The slot machine base game of gaming device 10 preferably displays a plurality of reels 34, preferably three to five reels 34, in mechanical or video form on one or more of the display devices. Each reel 34 displays a plurality of indicia such as bells, hearts, fruits, numbers, letters, bars or other images which preferably correspond to a theme associated with the gaming device 10. If the reels 34 are in video form, the display device displaying the video reels 34 is preferably a video monitor. Each base game, especially in the slot machine base game of the gaming device 10, includes speakers 36 for making sounds or playing music.

Figure 2:
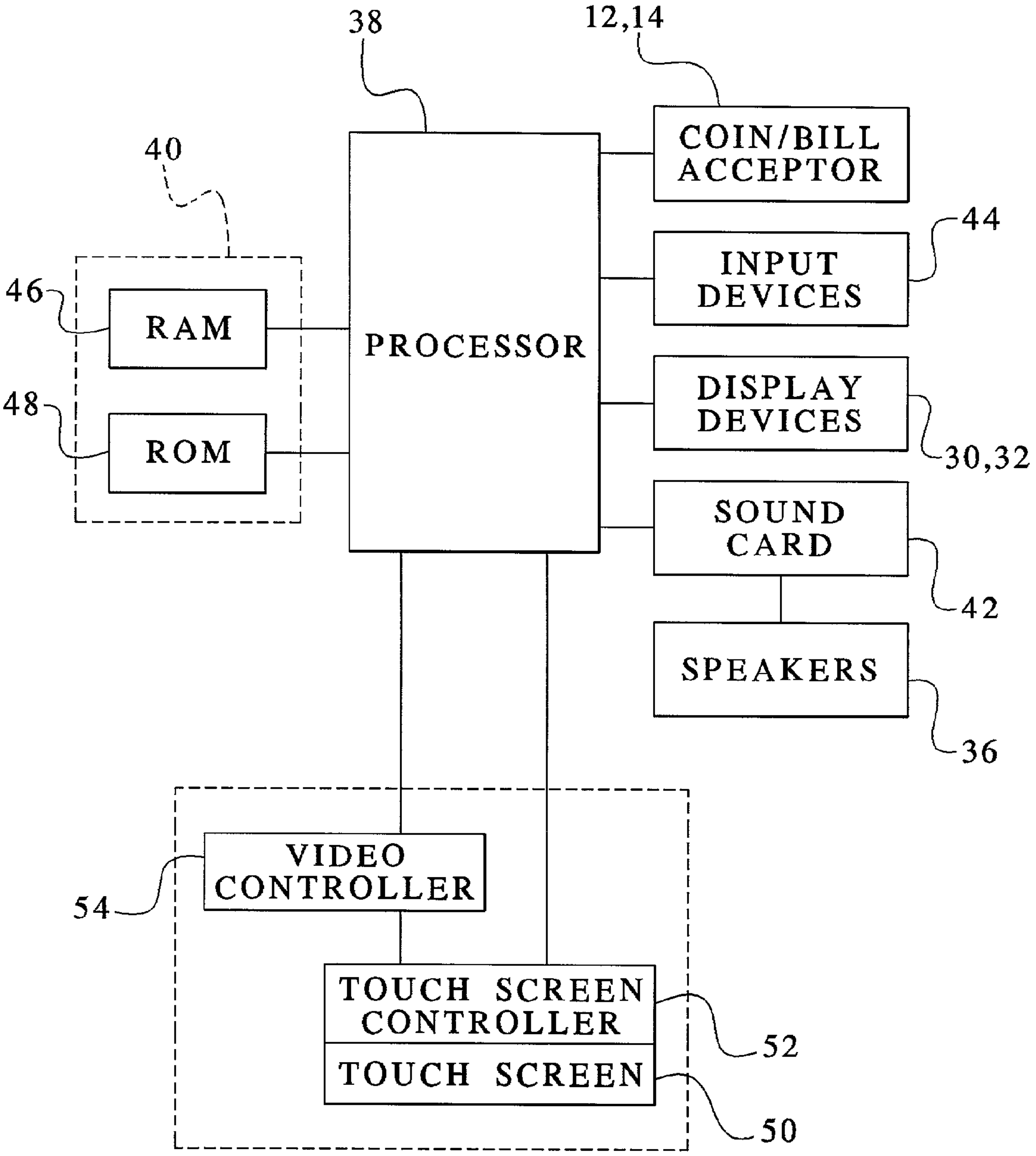
FIG. 2 is a schematic block diagram of the electronic configuration of one embodiment of the gaming device of the present invention.

Referring now to FIG. 2, a general electronic configuration of the gaming device 10 for the stand alone and bonus embodiments described above preferably includes: a processor 38; a memory device 40 for storing program code or other data; a central display device 30; an upper display device 32; a sound card 42; a plurality of speakers 36; and one or more input devices 44. The processor 38 is preferably a microprocessor or microcontroller-based platform which is capable of displaying images, symbols and other indicia such as images of people, characters, places, things and faces of cards. The memory device 40 includes random access memory (RAM) 46 for storing event data or other data generated or used during a particular game. The memory device 40 also includes read only memory (ROM) 48 for storing program code, which controls the gaming device 10 so that it plays a particular game in accordance with applicable game rules and pay tables.

As illustrated in FIG. 2, the player preferably uses the input devices 44 to input signals into gaming device 10. In the slot machine base game, the input devices 44 include the pull arm 18, play button 20, the bet one button 24 and the cash out button 26. A touch screen 50 and touch screen controller 52 are connected to a video controller 54 and processor 38. The terms "computer" or "controller" are used herein to refer collectively to the processor 38, the memory device 40, the sound card 42, the touch screen controller and the video controller 54.

In certain instances, it is preferable to use a touch screen 50 and an associated touch screen controller 52 instead of a conventional video monitor display device. The touch screen enables a player to input decisions into the gaming device 10 by sending a discrete signal based on the area of the touch screen 50 that the player touches or presses. As further illustrated in FIG. 2, the processor 38 connects to the coin slot 12 or payment acceptor 14, whereby the processor 38 requires a player to deposit a certain amount of money in to start the game.

It should be appreciated that although a processor 38 and memory device 40 are preferable implementations of the present invention, the present invention also includes being implemented via one or more application-specific integrated circuits (ASIC's), one or more hard-wired devices, or one or more mechanical devices (collectively referred to herein as a "processor"). Furthermore, although the processor 38 and memory device 40 preferably reside in each gaming device 10 unit, the present invention includes providing some or all of their functions at a central location such as a network server for communication to a playing station such as over a local area network (LAN), wide area network (WAN), Internet connection, microwave link, and the like.

With reference to the slot machine base game of FIGS. 1A and 1B, to operate the gaming device 10, the player inserts the appropriate amount of tokens or money in the coin slot 12 or the payment acceptor 14 and then pulls the arm 18 or pushes the play button 20. The reels 34 then begin to spin. Eventually, the reels 34 come to a stop. As long as the player has credits remaining, the player can spin the reels 34 again. Depending upon where the reels 34 stop, the player may or may not win additional credits.

In addition to winning base game credits, the gaming device 10, including any of the base games disclosed above, also includes bonus games that give players the opportunity to win credits. The gaming device 10 preferably employs a video-based display device 30 or 32 for the bonus games. The bonus games include a program that automatically begins when the player achieves a qualifying condition in the base game.

In the slot machine embodiment, the qualifying condition includes a particular symbol or symbol combination generated on a display device. As illustrated in the five reel slot game shown in FIGS. 1A and 1B, the qualifying condition includes the number seven appearing on, e.g., three adjacent reels 34 along a payline 56. It should be appreciated that the present invention includes one or more paylines, such as payline 56, wherein the paylines can be horizontal, diagonal or any combination thereof. An alternative scatter pay qualifying condition includes the number seven appearing on, e.g. three adjacent reels 34 but not necessarily along a payline 56, appearing on any different set of reels 34 three times or appearing anywhere on the display device the necessary number of times.

Masked Numbers

Figure 3A:
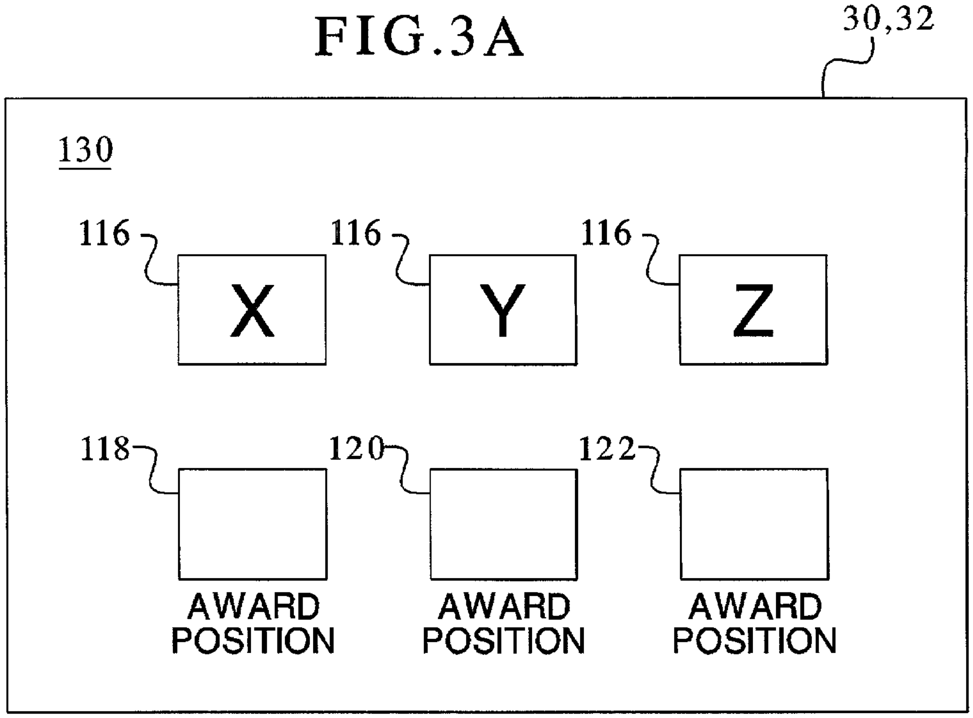
FIGS. 3A and 3B are front elevation views of one of the display devices that illustrate the player's placement of masked numbers into award positions.
Figure 3B:
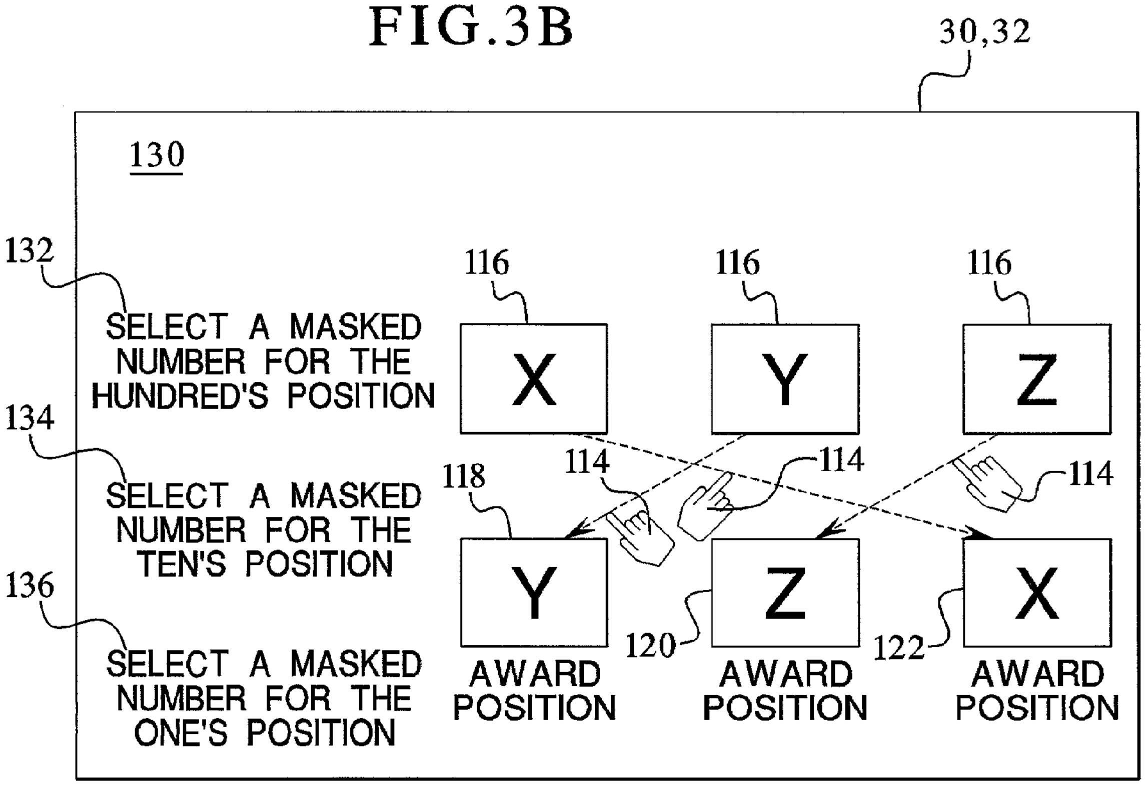

Referring now to FIGS. 3A and 3B, the game displays three selectable selections or masked numbers 116, namely, the "X," "Y" and "Z" selections or masked numbers 116. The selections or masked numbers 116 illustrated generally on the screen 130, as well as other inputs and indicators, preferably contain indicia that relate to a theme of the gaming device. The selections or masked numbers 116 hide numbers or digits that are revealed and become part of the player's award. That is, the player's award is based on the order of numbers or digits associated with the selections or revealed when the masked numbers are unmasked. For purposes of this application, "selections" and "masked numbers" are used interchangeably.

In an embodiment, at the same time that the "X," "Y" and "Z" selections 116 are displayed, the game also displays a number of positions 118, 120 and 122, which correspond to digits of the player's award. The positions 118, 120 and 122 do not initially contain or display numbers. In one preferred embodiment, the game displays the same number of positions or digits, such as positions or digits 118, 120 and 122, as there are masked numbers 116. That is, the game displays the same number of masked numbers 116 as the positions or digits. In this embodiment, the number of selections 116 sets the order of magnitude of the player's award. For reasons which become apparent below, the game of the present invention preferably displays an award having at least two positions or digits.

In another embodiment, the game displays more masked numbers 116 than positions or digits. That is, the player will not be able to select or use each displayed selection 116. This alternative embodiment may be implemented in a number of ways. In one implementation, the game generates a number of positions or digits, such as the positions 118, 120 and 122, which is equal to or less than the number of masked numbers 116. That is, if the game displays four selections 116, the game generates and displays two, three or four positions (preferably at least two). In this implementation, the game may be adapted to weight the selection, e.g., provide a 60% chance of selecting three numbers, provide a 20% chance of selecting two numbers and provide a 20% chance of selecting four numbers.

In another implementation, the game always displays the same number of positions or digits, e.g., the three positions 118, 120 and 122. The game then generates at least that number of masked numbers 116. This implementation sets the number of digits or the order of magnitude of the player's award, even though the first and second digits may turn out to be zero.

In a further implementation, the game displays less selections 116 than positions or digits. In this embodiment, the game may randomly generate the number of positions or digits or maintain a preset number as described above. This implementation may require the player to use or select a masked number 116 more than once. For instance, the game displays the "X" and "Y" numbers 116 and the positions 118, 120 and 122, wherein the player must use either the "X" or the "Y" twice. This implementation may also be adapted so that the game supplies one of the numbers. For instance, the game displays the "X" and "Y" numbers 116 and the positions 118, 120 and 122, wherein the one's digit 122 automatically has a value of zero. In this implementation, the player only determines the hundred's and the ten's digits.

In FIG. 3A, one of the display devices 30 or 32 displays a screen 130 that illustrates the player's choices of masked numbers 116 and award positions 118, 120 and 122. In one embodiment, upon generating the masked numbers 116 and the positions or digits 118, 120 and 122, the game preferably provides a visual, audio or audiovisual message 132 informing the player to select one of the selections 116 for the hundred's digit or position 118 as illustrated in FIG. 3B. In this example, the player 114 selects that the masked number 116 having the "Y" symbol or masking indicia be placed in the hundred's award position 118. The game then provides a visual, audio or audiovisual message 134 informing the player to select one of the selections 116 for the ten's digit or position 120. As illustrated in FIG. 3B, the player 114 selects that the masked number 116 having the "Z" symbol or masking indicia be placed in the ten's position 120.

The game thereafter provides a visual, audio or audiovisual message 136 informing the player to select one of the numbers 116 for the one's digit or position 122. As illustrated in FIG. 3B, the player 114 selects that the selection 116 having the "X" symbol masking indicia be placed in the one's position 122. The player selected masked award is thus "Y," "Z," "X" as illustrated in FIG. 3B by the positions 118, 120 and 122, respectively.

In one preferred embodiment, the game does not enable the player to reselect a previously selected masked number 116. For instance, when the player 114 picks the "Y" number 116 for the hundred's position 118, the game removes, grays out, darkens or otherwise indicates that the "Y" number 116 is no longer selectable. In this embodiment, the game may be adapted to fill in the last digit, e.g., the position 122, after the player makes the second to last pick, since there is only one other choice. In another embodiment, the player is able to pick the same masked number 116 a predefined number of times or any amount of times, so that the selected masked award can thus be "Z," "Z," "Z," if desired.

Upon providing the message 132, 134 or 136, the game highlights, flashes or otherwise indicates the hundred's 118, ten's 120 and one's 122 positions, respectively, and/or grays out or otherwise indicates that the other positions are not to be currently filled. The present invention includes a selection ordering device that enables the player to order the selections. The selection orderer may be adapted a plurality of ways. In one embodiment, the selection orderer is adapted so that the selections 116 are selectable areas of a touch screen 50 that are each individually adapted to send a discrete input to the processor 38. When the game highlights the hundred's position 118 and the player selects the "Y" number 116, the game places the "Y" in the hundred's digit. The game alternatively uses separate electromechanical devices (not illustrated) representing each of the numbers 116 in a like manner as the touch screen 50 areas.

In another embodiment, the selection orderer is adapted so that the touch screen 50 enables the player to press and drag or place a number 116 on a position or digit. The selection orderer in one implementation visually displays the number 116 moving to the desired digit, so that the player can discern when it is in position. In another implementation, the selection orderer maintains an area in the memory device 40 that acts similar to the Microsoft™ clipboard, whereby the game remembers the last number 116 that the player selected. For instance, if the player selects the "X" number 116, the game stores the "X" on the clipboard. When the player touches the one's digit 122, the game remembers that the "X" is on the clipboard and places the "X" in the one's position 122. If the player selects two numbers 116 sequentially, the game may be adapted to either write over or maintain the original selection.

The select and drag or select and place embodiments of the selection orderer are not time dependent and may be advantageous in that they let the player fill in the award digits as desired by the player. These selection orderers may further be adapted to allow players to change their minds and move the selections 116 after they have been placed in a position or digit. If the player moves a number 116 to an empty position or digit, the game needs to take no further action and awaits the player's next selection. If the player moves a selection 116 to an occupied position or digit, however, the game preferably writes over the previous selection, redisplays the removed selection 116 on the display device 30 or 32, ungrays it or otherwise indicates that it is once again selectable. The game may be adapted to allow the player to change masked numbers a limited or unlimited number of times. This embodiment preferably includes a "keep it" or select button (not illustrated), which enables the player to send a signal to the processor to indicate that the current positioning or ordering is satisfactory and to reveal the award as selected.

Figure 3C:
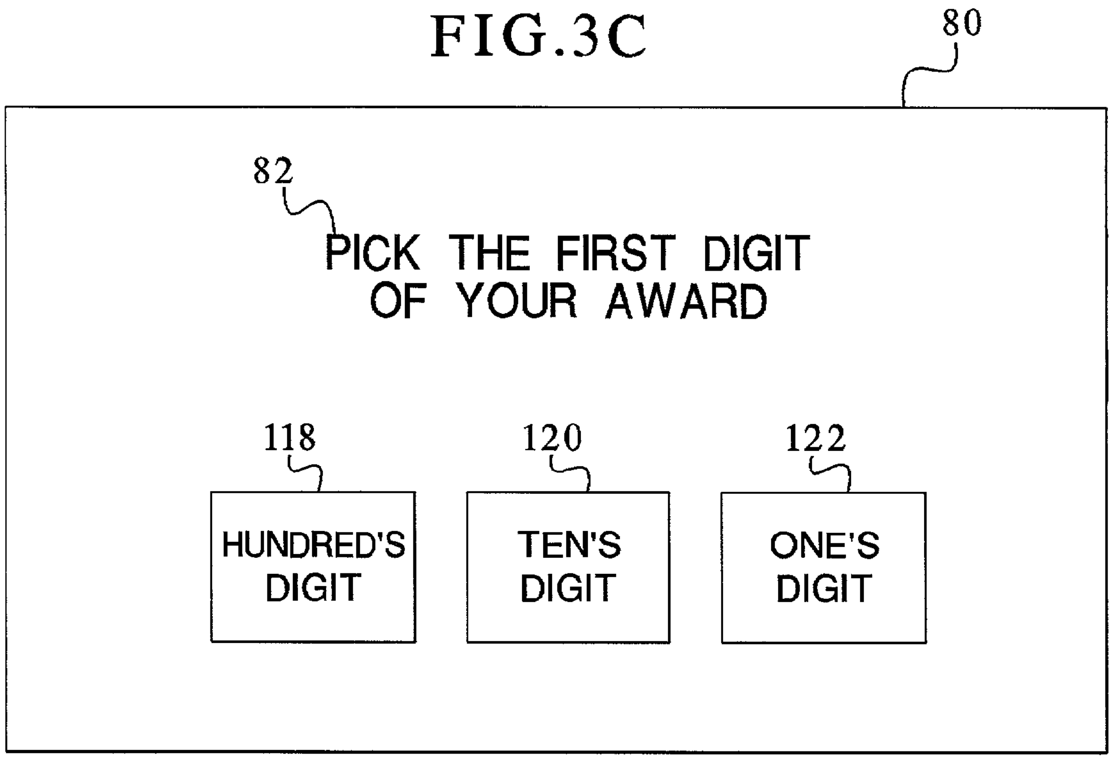
FIGS. 3C and 3D are front elevation views of one of the display devices that illustrate one preferred embodiment wherein the gaming device assigns a hidden number to the player's pick and the player selects which digit receives the number.
Figure 3D:
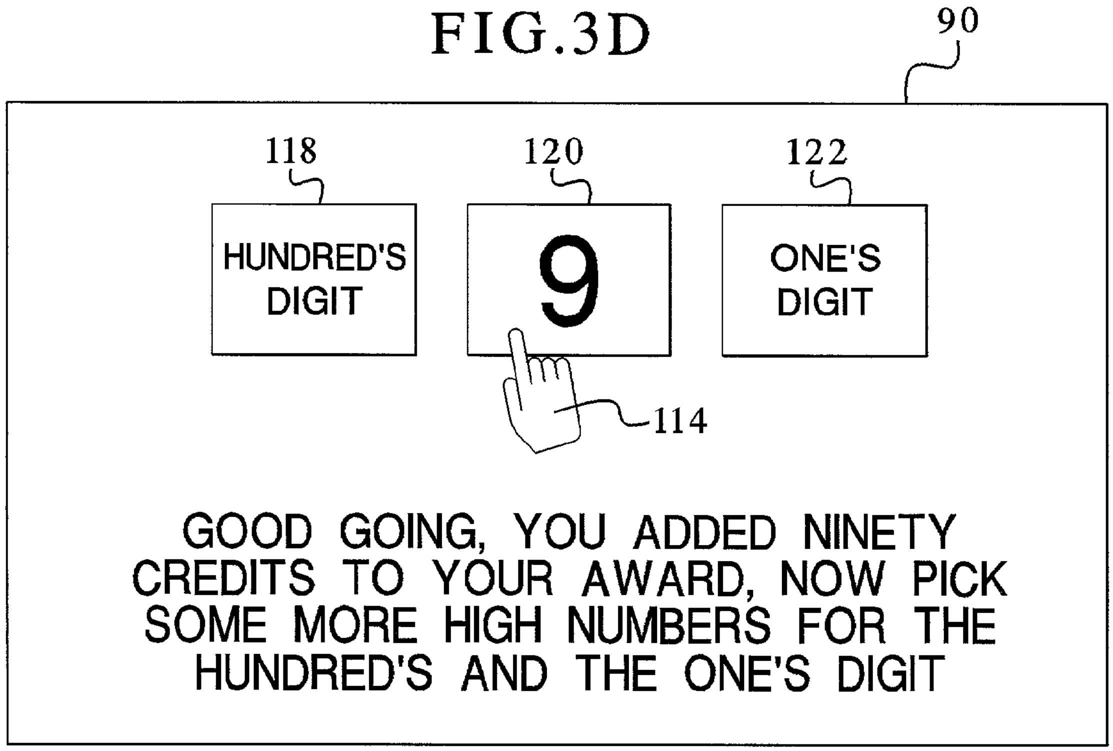

Referring now to FIGS. 3C and 3D, one preferred embodiment of the present invention is illustrated. The screen 80 of FIG. 3C displays the award positions or digits 118, 120 and 122, but does not display the masked numbers or selections 116. The digits may have any desired identifying indicia, such as the "hundreds digit," "tens digit" and "ones digit" as illustrated. In this embodiment, one or more audio, visual or audio visual messages, such as the message 82, instruct the player, e.g., to "pick the first digit of your award."

Gaming device 10 in one preferred embodiment randomly determines a number for each of the player's picks. Gaming device 10, for example, may assign: (i) the number nine to the player's first pick of a digit; (ii) the number three to the player's second pick of a digit; and (iii) the number five to the player's third pick of a digit. It should be appreciated that in this example, the player is best served to pick the hundred's digit 118 first, the one's digit 122 second and the ten's digit 120 third.

Gaming device 10 may be adapted to randomly assign numbers to each of the player's picks before the player actually makes a selection, or the game can make the random assignments as the player makes the selections. Preferably, however, even a contemporaneous assignment gives effect to the player's decision. Giving effect to the player's selection order is further discussed below in connection with FIG. 4 and the database 142 of FIG. 5.

In an alternative embodiment, the gaming device may assign the numbers based on the position that the player selects. In such a case, gaming device 10 assigns a number to the hundred's digit 118, the ten's digit 120 and the one's digit 122 before the player makes any selections. Here, the order that the player selects the digits does not affect the overall award, which is less desirable. Not giving effect to the player's selection order is further discussed below in connection with FIG. 4 and the databases 144 through 148 of FIG. 5.

In the screen 90 of FIG. 3D, after receiving the message 82, "pick the first digit of your award" (FIG. 3C), the player 114 selects the ten's digit 120, and gaming device 10 reveals the nine. The gaming device 10 then displays a second audio, visual or audiovisual message 84, such as, "Good going, you added ninety credits to your award, now pick some more high numbers for the hundred's and the one's digit." The player then selects either the hundred's digit 118 or the one's digit 122, the gaming device 10 reveals a number and this process repeats until each of the digits displays a number, wherein the player's overall award is complete. This preferred embodiment may be adapted to have any number of award positions or digits.

Figure 4:
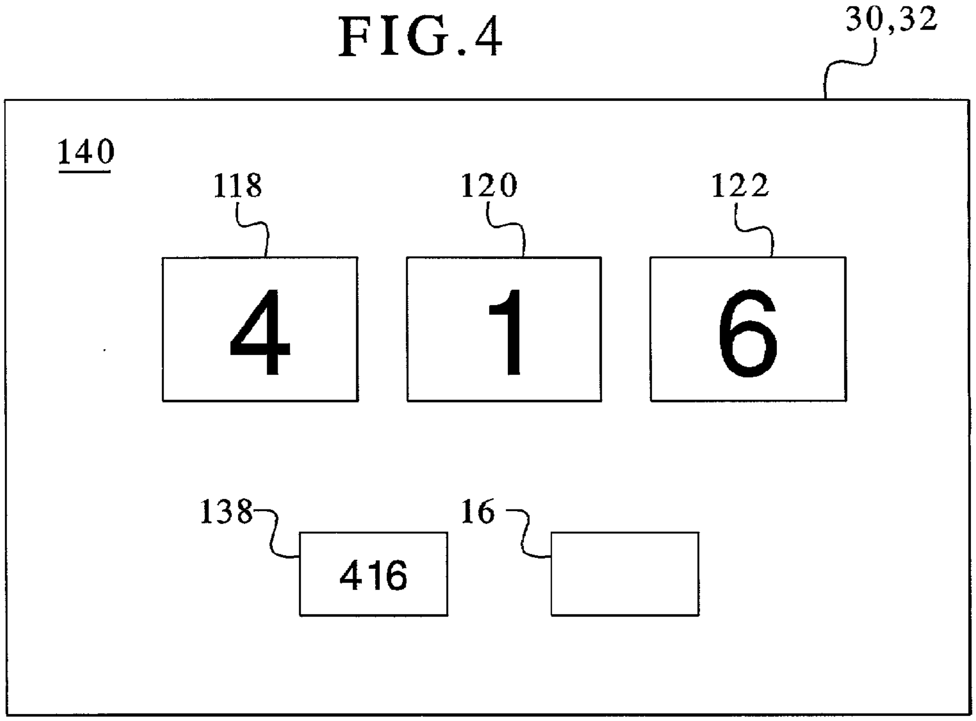
FIG. 4 is a front elevation view of one of the display devices that illustrates the revealing of the player's award.

Referring now to FIG. 4, one of the display devices 30 or 32 illustrates the revealing of the player's award. A screen 140 displays the positions or digits 118, 120 and 122, but not the masked numbers 116. The game of FIGS. 3A and 3B has removed the masked numbers 116 to reveal the player's award of 416, or the game of FIGS. 3C and 3D has reached the point where the player has selected all three digits. The screen 140 also displays a paid display 138 and a simulated credit display 16. The paid display 138 indicates the award that the player has won by placing the masked numbers in the desired positions. The total credit display 16 displays the player's total awards or credits, which includes the additional amount generated by the recent award. The award displayed by the positions 118, 120 and 122 may be game credits or game credit multipliers. The game may be adapted so that the award represents other items of value, such as a number of picks from a prize pool.

The game may reveal the masked numbers 116 all at once or one at a time. If revealed at different times, the game may reveal the masked numbers in the order that the player placed the numbers 116 in the positions (e.g., as the player places a number), from left to right, right to left, or in any other desired manner. If the game generates more masked numbers 116 than positions, the game may be adapted to reveal the unselected numbers 116 at this time or at any other time when the player can no longer select the number 116. Accordingly, the game may continue to display the masked numbers 116 or only the unselected masked numbers 116, if desired.

The game may be adapted to add other features to the reveal sequence to enhance the player's enjoyment and excitement. For example, the game in one embodiment shows all three revealed numbers to the player somewhere on the display device 30 or 32 before displaying which position the numbers belong to. The game in another embodiment audibly announces the generated numbers from the speakers 36 before revealing their positions. Informing the player of the chosen numbers but not their positions enhances the player's anticipation.

In one preferred embodiment, the award is formed by revealing values in the positions or digits 118 through 122, as illustrated. The award is the number created and displayed on the display device 30 or 32. In another embodiment, the game performs a mathematical operation using the generated values. For instance, the game in one implementation multiplies 4×1×6 and provides the player an award of 24. The game may be adapted to employ any combination of addition, multiplication, subtraction or division to form the player's award.

In a further embodiment, the award is formed through a combination of revealing values in the positions or digits and by performing a mathematical operation. For example, instead of displaying 416, the positions 118 through 122 display 4, 3× and 6, respectively. In this embodiment, the game takes the 4 and places it in the ten's digit to form an amount of 46. The game then multiplies the 46 amount by 3 to form the player's overall award. The game also preferably provides a suitable visual grouping display to show the player what is happening. The game could alternatively slide the 6 into the ten's digit, assume a value such as zero for the one's digit, form the amount of 460 and multiply the 460 amount by 3 to determine the player's award.

Figure 5:
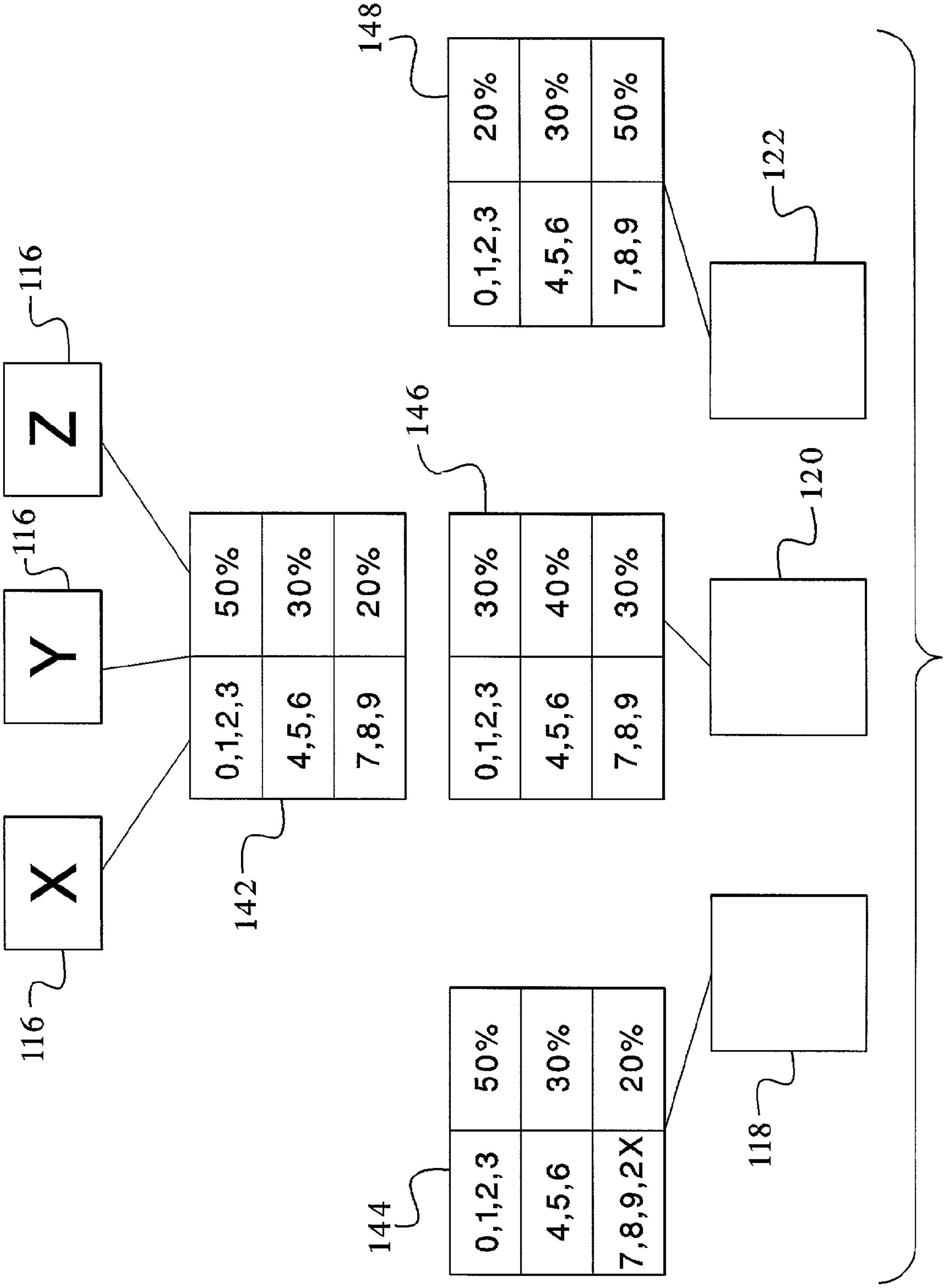
FIG. 5 is a schematic view of various database embodiments that may be employed to reveal the player's award.

Referring now to FIG. 5, the schematic diagram illustrates various database embodiments that may be employed to reveal the player's award. In one preferred embodiment, the player's placement of the masked numbers 116 (FIGS. 3A and 3B) or selection of the digits (FIGS. 3C and 3D) actually determines the award that is issued to the player in the paid display 138. That is, referring to FIG. 5, if the player would have placed the masked numbers 116 or selected digits in a different order, the game would have generated a different award such as 146, 164, 461, 614 and 641. In this embodiment, the game generates a value from a database for each masked number. Gaming device 10 may or may not be enabled to generate a number more than once. In one embodiment, the values are not weighted.

In another embodiment, the numbers or values are weighted, as illustrated by database 142. For each of the masked numbers "X," "Y," and "Z," the game generates and assigns or associates one of the values 0 through 9 from the database 142. The database 142 may also include multipliers or other mathematical modifiers as described above.

In the database 142, it is more likely that the game generates and assigns the 0, 1, 2 or 3 value to the masked numbers 116 (FIGS. 3A and 3B) or to the digits (FIGS. 3C and 3D) than the 4 through 9 values. With the database 142, it is more likely that the game generates and assigns the 4, 5 or 6 value to the masked numbers 116 than the 7 through 9 values. The weighting percentages of the database 142 may be adapted to be weighted as desired by the implementor or not weighted at all. The implementors weight the database so that the resulting award is, on average, in accordance with the desired payout percentage of the gaming device 10.

In another embodiment, the player's placement of the masked numbers 116 (FIGS. 3A and 3B) or selection of the digits (3C and 3D) does not actually affect the award that is issued to the player in the paid display 138. That is, referring to FIG. 4, if the player would have placed the masked numbers 116 or selected the digits in a different order, the game would still have generated the same award, 416. In this embodiment, like the last, the game generates values from weighted or non-weighted databases or based on any suitable probabilities. This embodiment, however, includes maintaining different databases for different positions or digits.

In FIG. 5, the hundred's position 118 has an associated database 144, the ten's position 120 has an associated database 146 and the one's position 122 has an associated database 148. Each database 144 through 148 preferably includes the values 0 through 9 and may also include multipliers or other mathematical modifiers as described above. The databases differ in the weighting of the different values. In the database 144, which is assigned or associated with the hundred's digit, it is most likely that the player obtains a hundred's digit of 0 through 3, second most likely that the player obtains a hundred's digit of 4 through 6 and least likely that the player obtains a hundred's digit of 7 through 9. It should be appreciated that this distribution is associated with the position 118 and is therefore independent of the particular masked number 116 that the player selects for the hundred's digit.

The weighting distribution is different for the tens digit 120, as illustrated by the database 146. Here, the middle values 4 through 6 are generated slightly more often than the lower or higher values. The higher values of 7, 8 and 9 each have a ten percent chance of being generated, while the lower values each have a less than ten percent likelihood of being generated. For the one's digit 122, the database 148 weights the values 0 through 9 such that the highest values are most likely to be generated, the middles vales the second most and lowest values the least most likely to be generated.

In the illustrated embodiment, it is thus more likely to receive a lower value in the hundred's position 118, a middle value, on average, in the ten's position 120 and a higher average value in the one's position 122. Different distributions can obviously be achieved in accordance with a desired payout percentage by varying the weightings of the individual databases. Each of the databases 142 through 148 is programmed and stored in the memory device 40 as is well known. One or more random number generators, which are also preferably stored as software code, generate numbers according to the desired weighting system.

Generating Masked Numbers in a Bonus Game

Figure 6:
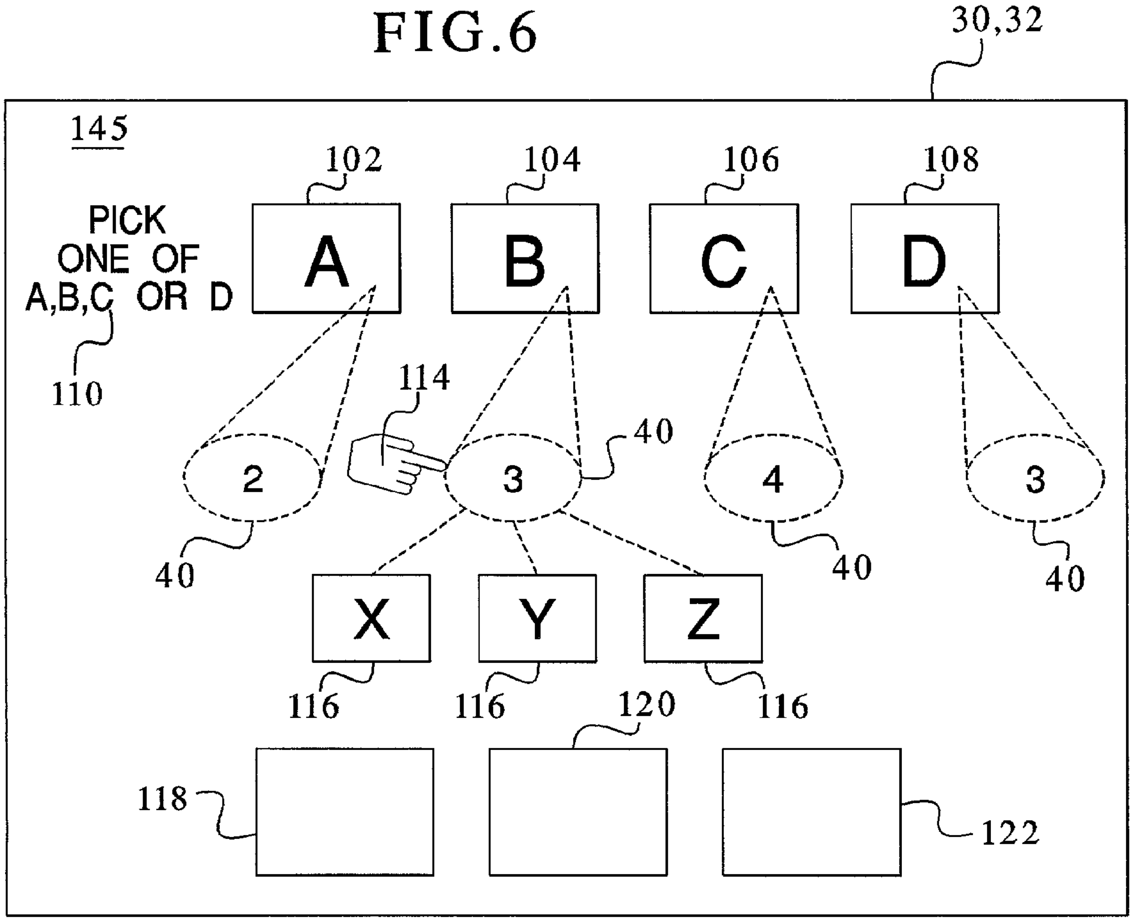
FIG. 6 is a front elevation view of one of the display devices that figuratively illustrates an initial random generation of a number of masked numbers that may form the player's award.

In one embodiment, the game provides a predefined number of masked numbers 116 (FIGS. 3A and 3B) or digits (FIGS. 3C and 3D) and preferably three masked numbers 116 or digits. In one alternative embodiment, the game varies the number of masked numbers 116 or digits. Referring now to FIG. 6, one of the display devices 30 or 32 displays a screen 145 that has an initial generation sequence for determining how many masked numbers 116 (FIGS. 3A and 3B) or digits (FIGS. 3C and 3D) are used to form the player's award. The screen 145 displays four inputs 102 though 108, which are designated to the player by their respective indicia or symbols, "A" through "D."The inputs 102 through 108 are each selectable choices, and the message 110 informs the player to pick one of them.

The screen 145 can present any number of selectable inputs, such as inputs 102 through 108, and is not limited to presenting four as illustrated. The selectable inputs in one embodiment are areas of a touch screen 50 (see FIG. 2) in communication with the processor 38 and a touch screen controller 52. The inputs may alternatively be separate electromechanical input devices, mounted elsewhere on gaming device 10, which are in communication with the processor 38. A message 110 is visually displayed, audibly displayed through speakers 36 or both.

The inputs 102 through 108 are each associated with a quantity of the masked numbers 116 or digits, such as digits 118, 120 and 122, which are stored in an area of the memory device 40. The area of the memory device 40 having the quantity of masked numbers 116 or digits is illustrated here in phantom for purposes of describing the present invention. In the game, the player does not know the quantity of masked numbers 116 or digits associated with any of the selectable inputs.

To simplify the illustration, the screen 100 illustrates one embodiment, wherein the game randomly assigns a quantity of masked numbers 116 to each selectable input 102 through 108. It should be appreciated, however, that gaming device 10 may alternatively be adapted to assign a quantity of digits, such as the digits 118 through 122, to the inputs 102 through 108. Each selectable input is randomly assigned a quantity of masked numbers 116 from a database or table (not illustrated), which is stored in the memory device 40. The database may be weighted such that a particular quantity or set of quantities is assigned more often than another quantity or set of quantities. This embodiment enables the game to reveal the quantities of the masked numbers 116 for the unselected inputs after the player chooses one of the selectable inputs 102 through 108.

In another embodiment (not illustrated), the game does not assign a different quantity of masked numbers 116 to each input 102 through 108; rather, the game randomly assigns a quantity to a particular game. That is, the game generates and displays the same quantity of masked numbers 116 no matter which input the player selects. In this embodiment, the game also picks from a database stored in the memory device 40 that may be weighted such that a particular quantity or set of quantities is assigned more often than another quantity or set of quantities.

In one embodiment, the database is weighted so that it is more likely that the player generates a particular number of, such as three, masked numbers 116. The screen 145 illustrates that if the player selects either the "B" input 104 or the "D" input 108, the game displays three masked numbers 116 on the display device 30 or 32. If the player selects the "A" input 102, the game only displays two masked numbers 116, and if the player selects the "C" input 106, the game displays four masked numbers 116. For the reasons discussed below, the game preferably provides at least two masked numbers 116. As illustrated in this schematic example, when the player 114 picks the "B" input 104, the game generates three masked numbers 116.

Bonus Round Display

The game as illustrated in FIGS. 3A through 6 does not resemble the known primary games of slot poker, keno or blackjack. Indeed, the embodiments illustrated to this point are preferably a bonus game which can be triggered by any of the above mentioned primary games or any other primary game. The bonus game preferably includes indicia and a theme in accordance with a theme of the base game. In one implementation, the theme of the game includes a mother kangaroos and baby kangaroos or joeys.

The joeys can represent either masked numbers 116 or digits, e.g., digits 118 thorough 122. In one implementation, the game is predefined to provide three joeys and three digits or positions. Another implementation employs the selectable inputs 102 through 108, which are each mother kangaroos. Here, the player selects one of the mother kangaroos and a quantity associated with the selected input appears, e.g., the number "three," whereby this quantity of joeys are shown to come out of the selected mother kangaroo.

In one implementation (FIGS. 3A and 3B), the game asks the player to place the joeys on one of a plurality of predefined award positions or digits in the order that the player desires. In another implementation (FIGS. 3C and 3D), the game asks the player to pick a joey digit to reveal a number of the player's award. Once the joeys are picked, the joey digits each reveal a number and collectively form the player's award. If one of the joeys reveals a multiplier or a mathematical modifier instead of a value, the multiplier multiplies an award formed by the values from the remaining joeys.

Player Selectable Awards in Combination With Slot

Figure 7:
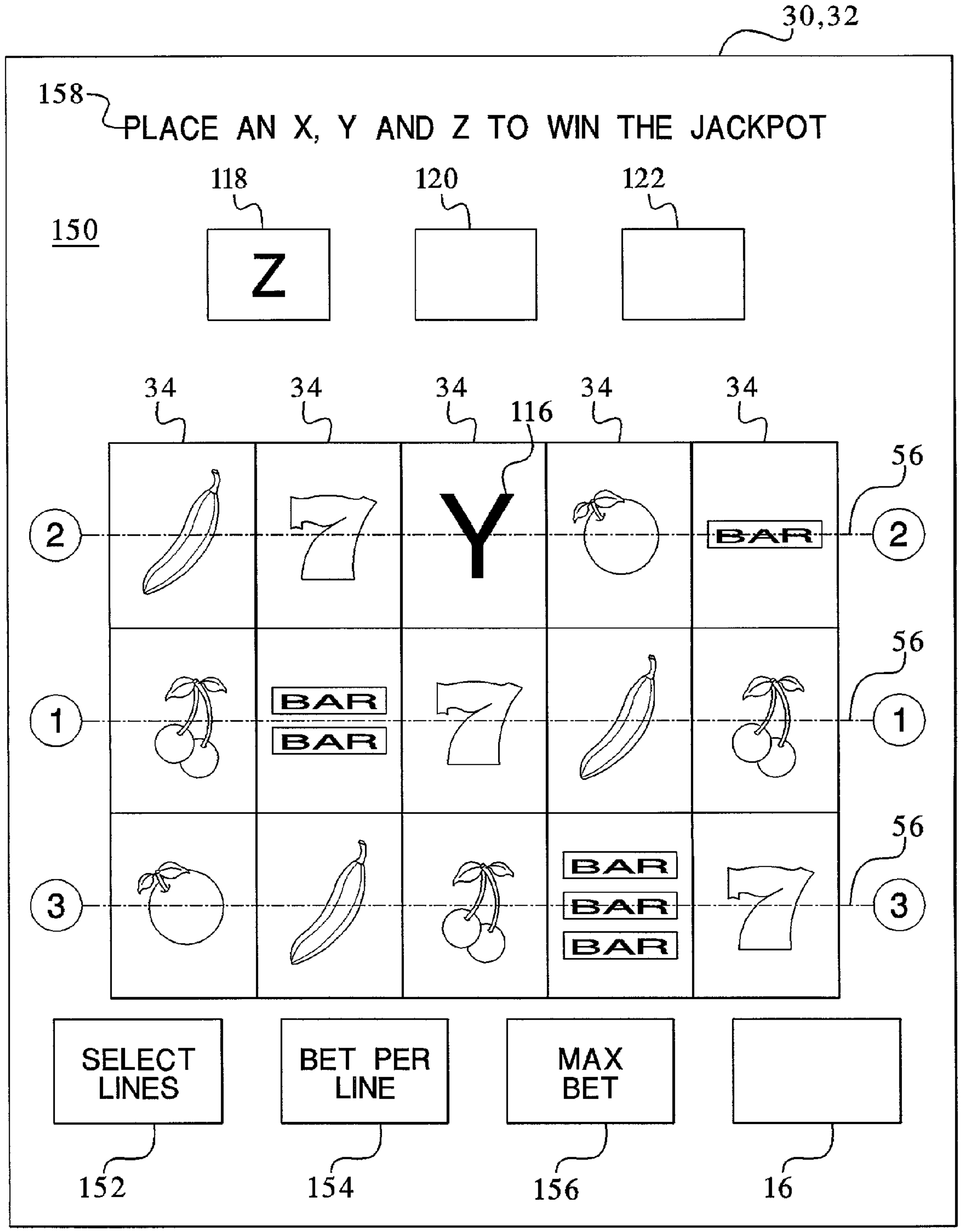
FIG. 7 is a front elevation view of one of the display devices illustrating an embodiment wherein the player selectable award of the present invention is incorporated into the base or primary game of slot.

Referring now to FIG. 7, a screen 150 illustrates an embodiment wherein the player selectable award of the present invention is incorporated into the base or primary game of slot. One of the display devices 30 or 32 displays the reels 34 and a plurality of paylines 56 having the functions as described above in connection with FIGS. 1A and 1B. The screen 150 also includes other well known selectable touch screen areas, such as the select lines input 152, bet per line input 154 and max bet input 156. The screen 150 further includes well known indicators, such as the total credit display 16.

The select lines input 152 enables the player to pick whether to play one, two or three paylines 56. The slot machine of the present invention may be adapted to have any number of paylines 56 and typically has one, three, five, nine, fifteen or twenty-five paylines 56. The bet per line input 154 enables the player to wager a desired amount of coins or tokens on the desired number of paylines. The slot machine of the present invention may be adapted to allow the player to wager any amount of coins or tokens per payline and in one preferred embodiment allows the player to wager up to five coins per payline. The max bet input 156 is a convenience input that enables the player to play the maximum amount of coins or tokens on all available paylines upon a single input by the player.

The screen 150 also includes the positions or digits 118 through 122 having the functions as described above in connection with FIGS. 3A through 6. The slot embodiment may be adapted to provide any number of positions, not just three, and the number of positions may vary randomly or according to a preset program. In the illustrated embodiment, as above, the game provides three positions or digits, so that the player's "jackpot" award has three digits, even if one or both the first two digits are zero.

In connection with the slot game, the present invention operates substantially as described above. The main difference is in how the game generates the masked numbers 116. Instead of generating the masked numbers 116 all at once, the slot base game generates the masked numbers 116 intermittently according to the number of masked numbers 116 that the implementors place on the reels 34, the rules of the game, the player's wager and luck.

The implementors dispose masked numbers 116 on the reels 34 to achieve the desired payout percentage of the game. One, a plurality of or all the reels may include masked numbers 116. Each of the reels having masked numbers 116 may be adapted to have one or a plurality of the masked numbers 116. The game may be adapted to require the player to generate a masked number for use with the jackpot award: (i) on an active payline; (ii) on an active payline having max coins wagered; (iii) when all paylines are active; or (iv) when the player plays max coins. The game may alternatively provide a masked number 116 anytime the game generates one anywhere on the reels 34.

The player selectable award of the present invention can be combined with the base game of slot in many different ways. As indicated by the visual, audio or audiovisual message 158, in one implementation the player must place an "X," "Y" and "Z" masked number 116 in the positions 118, 120 and 122, as before, to win the jackpot award. If the player generates the "X" a number of times in a row, the subsequent generations after the first generation do not help the player win the jackpot. In this implementation, the game may be adapted to associate a value database with the masked numbers 116 or the positions 118 through 122, as described in connection with FIG. 6.

In another implementation, the reels 34 contain masked numbers 116 having the same indicia. That is, instead of "X," "Y" and "Z," the numbers 116 have only "X" or some other desired indicia. The player places the masked numbers 116 in the positions or digits as before. Here, the game preferably assigns a value and thus a value database to the position or digit 118, 120 or 122 with which the player places the number 116.

In a further alternative embodiment, which coincides with the disclosure in connection with FIGS. 3C and 3D, one or more of the reels 34 contains a symbol that enables the player to select one of the digits or positions 118 through 122. One or more players select the digits until each have been selected.

In any implementation, the game may reveal the masked numbers 116 or digit selections as the player places them or alternatively after each position has been selected or has a masked number. If revealed all at once, the game may be further adapted to allow the player a chance to rearrange the selection a limited or unlimited number of times before revealing the award. In this rearrangement, the game would flip flop a non-revealed number placed on one position with a non-revealed number placed on another position. The game would provide a "keep it" or select button (not illustrated), which would enable the player to send a signal to the processor 38 that the current positioning is satisfactory and to reveal the award as selected.

The award in the slot machine embodiment is a secondary or "jackpot" award. The slot machine game generates other base game awards according to a paytable of winning combinations of the symbols presented by the reels 34. The player selectable award of the present invention, which is in the nature of a bonus or extra award, is likely to be a relatively large award in relation to the base game awards to attract players and to increase the fun and excitement associated with the gaming device 10. Large, one time or intermittent awards of this type are often termed jackpot awards.

The player selectable award as described in connection with the base game of slot is a persistent award, that is, it takes a series of games or a period of time before a player wins the award. That is, the positions or digits 118 through 122 preferably do not zero out when a player cashes out by selecting the cash out button 26. If a first player generates the "Z" and the "X" and leaves the gaming device 10 before generating the "Y" and the jackpot award, a second player stands in the first player's place (only needs the "Y") upon beginning play. The award may also be progressive and be funded by a percentage, e.g., ten percent, of each wager.

It should be appreciated that the base games of blackjack, poker and keno may be modified to include the player selectable award feature of the present invention. In either of the card base games of poker and blackjack, designated face cards or cards having other indicia interspersed among the face cards are used as the masked symbols 116. In the base game of keno, designated numbers or other indicia interspersed among the keno numbers are used as the masked symbols 116.

Award Modifications

The game of the present invention, in any of the embodiments previously described, includes modifying the player's award. In one embodiment, the gaming device randomly determines when to modify the player's award. In another embodiment, the gaming device modifies the player's current award when the current award is less than the expected value.

In another embodiment, gaming device 10 provides the award modification as an option. That is, after placing masked numbers 116 in the positions or digits 118 through 122 (FIGS. 3A and 3B) or selecting each of the digits (3C to 3D), and revealing the corresponding award, the game provides an opportunity or option to the player to change or keep the award. This option may be randomly generated and presented to the player from time to time or, in one embodiment, the game generates the option after each original award generation.

Figure 8:
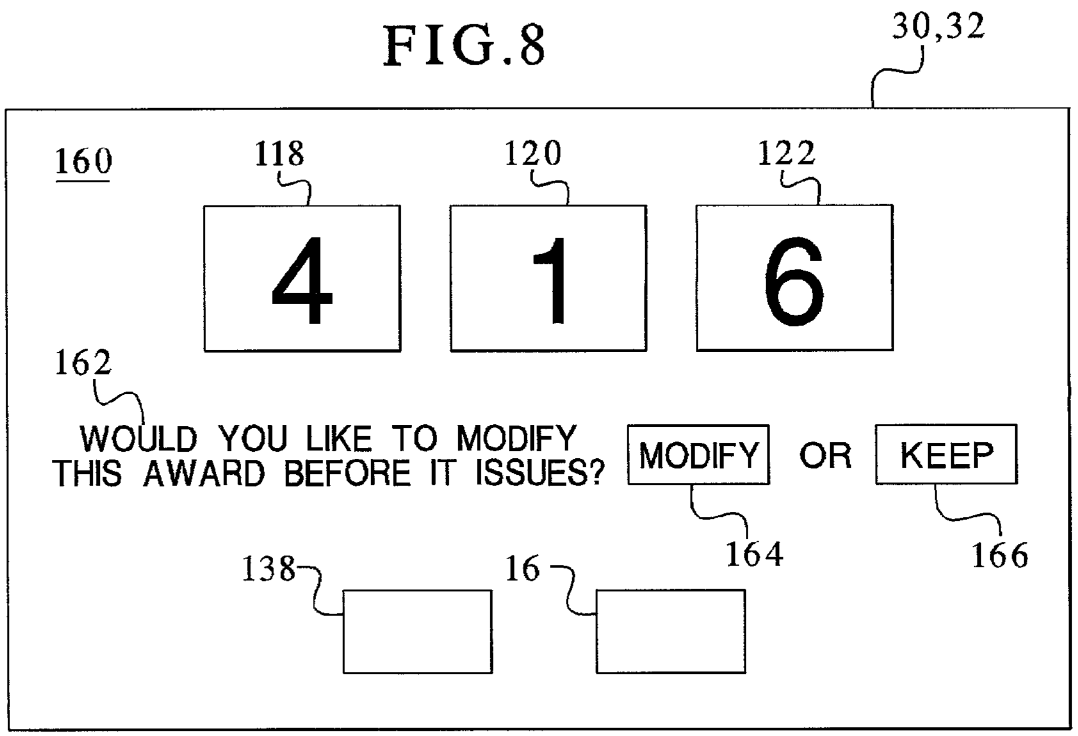
FIG. 8 is a front elevation view of one of the display devices illustrating an award modification option screen of the present invention, wherein the player decides whether to keep or modify a generated award.

Referring now to FIG. 8, a screen 160 generally illustrates the award modification option of the present invention. In this screen, the game has generated the award of 416 but has yet to download or pay the award to the player, whereby the paid display 138 would display the award, and the total credit display 16 would update accordingly. The option includes a suitable visual, audio or audiovisual message 162 inquiring whether the player wishes to modify the original award before it issues. The option also includes a modify input 164 and keep input 166, which are preferably simulated areas of a touch screen 50.

If the player elects to keep the original award by selecting the keep input 166, the game provides it to the player and game play resumes. If the player elects to modify the award by selecting the modify input 164, the game in one embodiment randomly generates one of a number of different modification methods. The random selection of a modification method also applies to embodiments wherein modification is not an option and instead occurs randomly or based on an expected value.

Since the different methods have substantially different potential outcomes, the generation of the method is preferably weighted, although it does not have to be. Generally, the more drastically the original award may change due to a modification method, the less likely it is that the game generates that modification method.

The modification methods includes the following: (i) an award rearrangement or scramble using existing numbers or digits; (ii) a complete regeneration; (iii) an addition of a digit to the original award; (iv) a removal of a digit from the original award; and (v) a multiplication of the original award. Each of these modification methods is discussed in turn below. Alternative implementations of the award modification embodiment include any combination of less than all of the modification methods.

In the kangaroo/joey theme described above, in one implementation, three joeys or masked numbers 116 appear from the mother kangaroo. The player orders the joeys, and the game reveals an award and an award modification option. In one implementation, the game provides an area of the touch screen 50 which is associated with a displayed help button. When the player presses the help button (not illustrated), the display 30 or 32 provides a help screen (not illustrated) that explains each of the modification methods, i.e., the potential awards and losses associated with each method. If the player chooses to modify the award, another joey or theme related symbol appears from the mother kangaroo and reveals which modification option the player has drawn.

Figure 9:
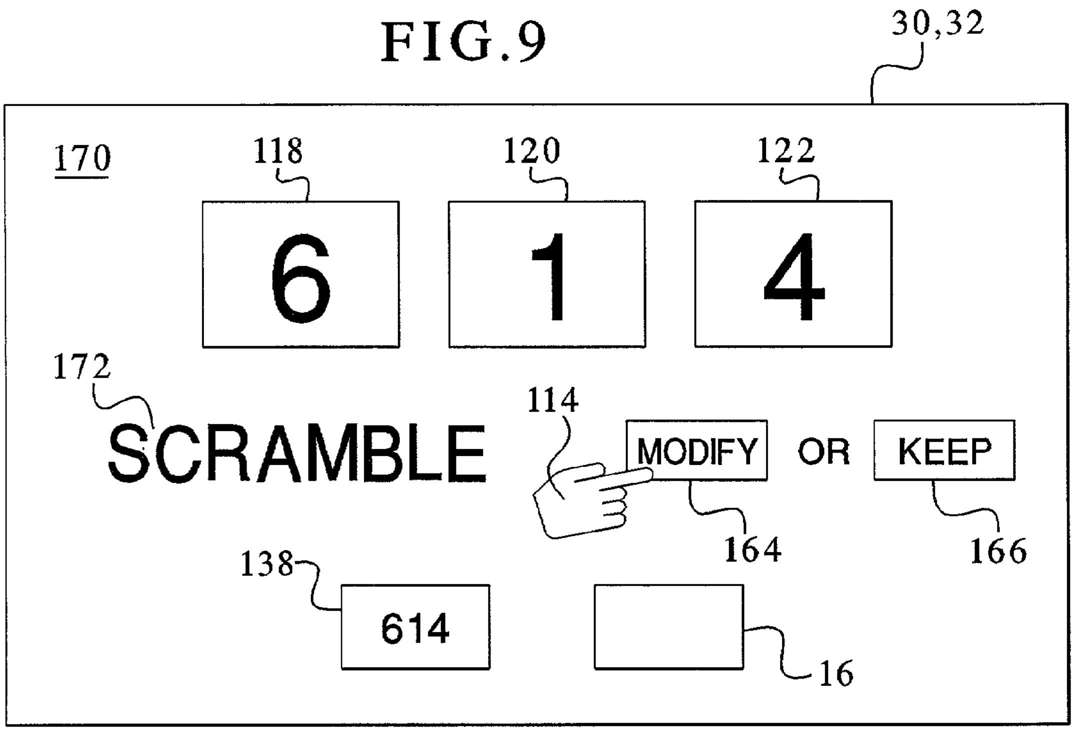
FIG. 9 is a front elevation view of one of the display devices illustrating the award scramble or rearrangement modification method of the present invention.

Referring now to FIG. 9, a screen 170 displays the award rearrangement or scramble modification method of the present invention, wherein one of the display devices 30 or 32 displays the original award of 416 in the positions or digits 118 through 122. It should be appreciated that the rearrangement option of the present invention may be an option for the bonus and base game embodiments disclosed above in connection with the player selectable awards. It may also be an option for any award generated via the gaming device 10 and is not limited to the player selectable awards as herein described. The digits or positions 118 through 122 are, however, helpful in describing the option.

The game provides the scramble modification method to the player according to a predefined or varying probability stored in the memory device 40. Since the scramble modification method maintains the order of magnitude of the player's award (i.e., such as a three digit award) and may result in a higher or lower award (i.e. which results from the change in the order of the numbers in the award positions), this method is generated relatively often. The game can alternatively predefine this option to result from the occurrence of some game event, such as a particular combination of slot symbols, face cards or other event.

The scramble modification option enables the player to flip-flop or scramble the digits, i.e., change the order of the digits in the award. The scramble works in one of two primary ways. Assuming the award has three digits (even if the first and second digits are zero), the game either randomly selects from all six combinations of three digits, including the player's current award, or, from the five remaining combinations besides the current award. That is, if the player decides to risk the award, the game generates a different award, for better or worse. In the above example, the player risking an award of 416 might obtain an award of 146, 164, 461, 614 or 641. In the other implementation, the player might also receive 416 again. In either case, the game in one implementation evenly weights each possibility.

In the screen 170 of FIG. 9, when the player 114 selects the modify input 164, the game displays a suitable symbol or message 172 indicating that the scramble modification method has been generated. The game thereafter scrambles or rearranges the original award and forms a new award of 614. The new award is in one embodiment immediately downloaded to the paid display 138. In an alternative embodiment, the scramble modification method may be adapted to provide multiple rearrangement opportunities. In a further alternative embodiment, the game may be adapted to repeat the entire option process a predetermined number of times.

As described above, the player selectable award is preferably at least two and most preferably at least three digits. It should be appreciated that the award rearrangement option is inapplicable to an award of a single digit. The award rearrangement option is too simple for an award having two digits. Players would generally choose to rearrange an award of 19 to try to obtain an award of 91 and at the worst wind up with an award of 19 unless a related consolation award was less than the award of 19. Four digits provides a significant number of combinations for the player to understand and also requires a relatively substantial award. Therefore, the rearrangement option is preferably applied to a three digit award.

In an alternative embodiment, the game does not provide an option and instead automatically scrambles or rearranges the award when the expected value of the digits of the current award exceed the current award, i.e., when the smart play is to exercise the rearrangement option. Using the implementation wherein the game selects only from the different permutations of the player's award, in the example where the game generates an award of 416, the expected value after rearranging the award is (146+164+461+614+641)/5=405.2. Thus, even though three out of five results increase the current award of 416, the smart play is to keep the 416 award. The game in the auto-rearrange embodiment therefore does not rearrange the player's award. In this situation, the game may be adapted inform the player that the smart play is to keep the current award, but that the player may rearrange at the risk of obtaining a lower award.

In another alternative embodiment, gaming device 10 automatically and randomly rearranges the player's award. Gaming device 10, for example, may be adapted to rearrange the player's award on average once every ten games, wherein a random generation software generates a rearrangement using the weighted distribution.

Figure 10:
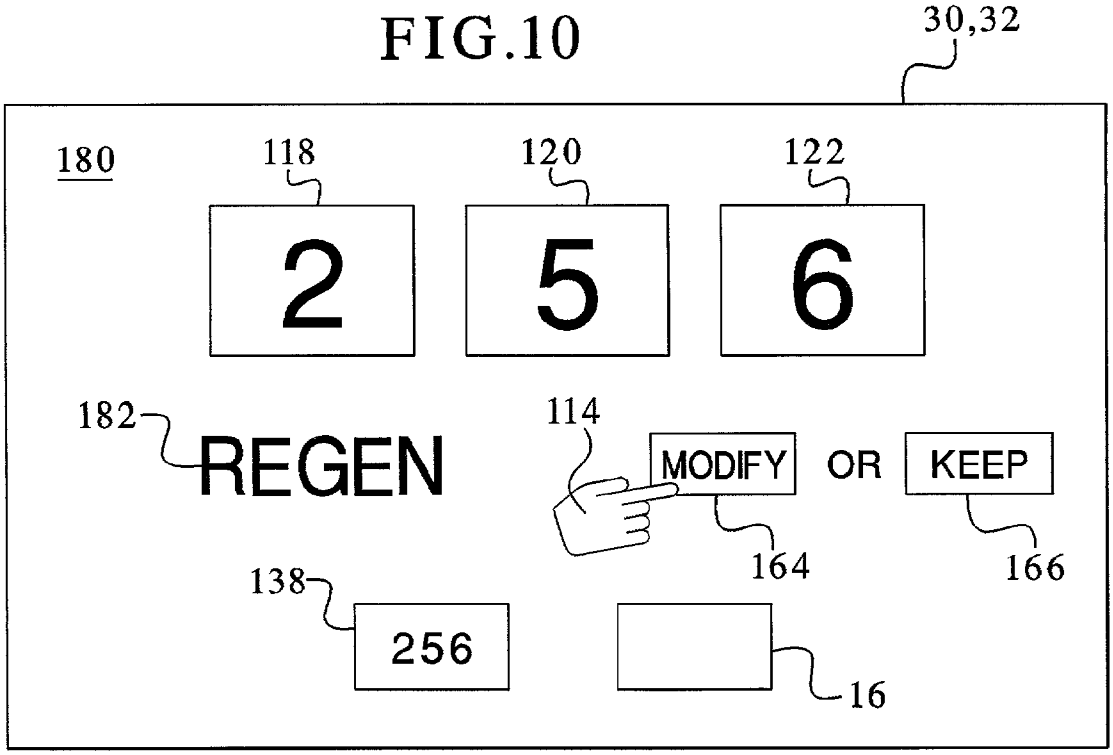
FIG. 10 is a front elevation view of one of the display devices illustrating the award regeneration modification method of the present invention.

Referring now to FIG. 10, a screen 180 displays the award regeneration option method of the present invention, wherein one of the display devices 30 or 32 displays the award of 416 in the award positions or digits 118 through 122. It should be appreciated that the regeneration option of the present invention may be an option for the bonus and base game embodiments disclosed above in connection with the player selectable awards.

The game provides the regeneration method to the player according to a predefined or varying probability stored in the memory device 40. Since the regeneration method maintains the order of magnitude of the player's award and may result in a higher or lower award, this method is generated relatively often. The game can alternatively predefine this option to result from the occurrence of some game event, such as a particular combination of slot symbols, face cards or other event.

The regeneration option enables the player to obtain a completely new set of digits, i.e., the new award is not constrained to have the same numbers as the old award. The regeneration in one embodiment includes randomly picking a number from zero to nine for each of the positions 118, 120 and 122, wherein each number has an equal chance of generation. This option can be favorable for the player who has an original award with low numbered digits or a detriment to the player with a high original award.

In the screen 180 of FIG. 10, when the player 114 selects the modify input 164, the game displays a suitable symbol or message 182 indicating that the regeneration modification method has been generated. The game thereafter regenerates the original award and forms a new award of 256. The new award is in one embodiment immediately downloaded to the paid display 138. In an alternative embodiment, the regeneration modification method may be adapted to provide multiple regeneration opportunities. In a further alternative embodiment, the game may be adapted to repeat the entire option processes a predetermined number of times.

In another alternative embodiment, gaming device 10 automatically and randomly regenerates the player's award. Gaming device 10, for example, may be adapted to randomly regenerate the player's award on average once every ten games. Further alternatively, gaming device 10 may be adapted to regenerate the player's award whenever the award falls below a predefined threshold.

Figure 11:
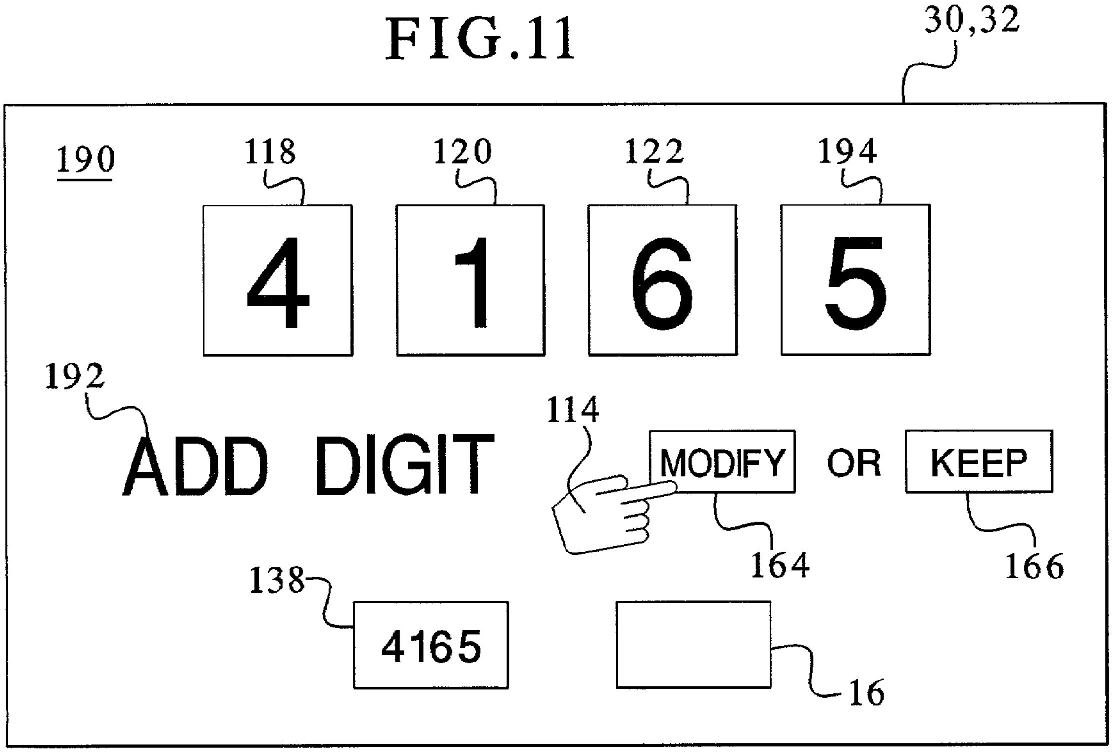
FIG. 11 is a front elevation view of one of the display devices illustrating the add digit modification method of the present invention.

Referring now to FIG. 11, a screen 190 displays the add digit modification option method of the present invention, wherein one of the display devices 30 or 32 displays the award of 416 in the positions or digits 118 through 122. It should be appreciated that the add digit option of the present invention may be an option for the bonus and base game embodiments disclosed above in connection with the player selectable awards.

The game provides the add digit method to the player according to a predefined or varying probability stored in the memory device 40. Since the add digit method changes the order of magnitude of the player's award (i.e., the number of digits in the award) and can only increase the original award, this method is infrequently generated. The game can alternatively predefine this option to result from the occurrence of some game event, such as a particular combination of slot symbols, face cards or other event.

The add digit method enables the player to obtain an extra digit, i.e., the new award has the same numbers in the same order as the old award, plus the new award has an extra digit. The add digit method in one embodiment includes randomly picking either the number zero or five and appending it to the right end or one's digit of the original award. The add digit method may be adapted to generate and add any number, zero to nine, in any one of the one's, ten's, hundred's or thousand's digits. The additional number generated obviously has less significance as it is placed in lower digits. It can be seen that this option is highly desirable for the player regardless of the size of the original award.

In another alternative embodiment, gaming device 10 automatically and randomly (as opposed to an option) adds a digit to the player's award. Gaming device 10, for example, may be adapted to add a digit upon the player's placement of a masked number 116 (FIGS. 3A and 3B) or selection of a digit, e.g., digits 118 through 122 (FIGS. 3C and 3D).

In the screen 190 of FIG. 11, when the player 114 selects the modify input 164, the game displays a suitable symbol or message 192 indicating that the add digit modification method has been generated. The game thereafter adds a number (here, either a zero or five) to a digit (here, the one's digit). The game randomly generates the number five and displays it in the new position or digit 194 to form a new award of 4165. The new award is in one embodiment immediately downloaded to the paid display 138. In an alternative embodiment, the game may be adapted to repeat the entire option processes a predetermined number of times.

Figure 12:
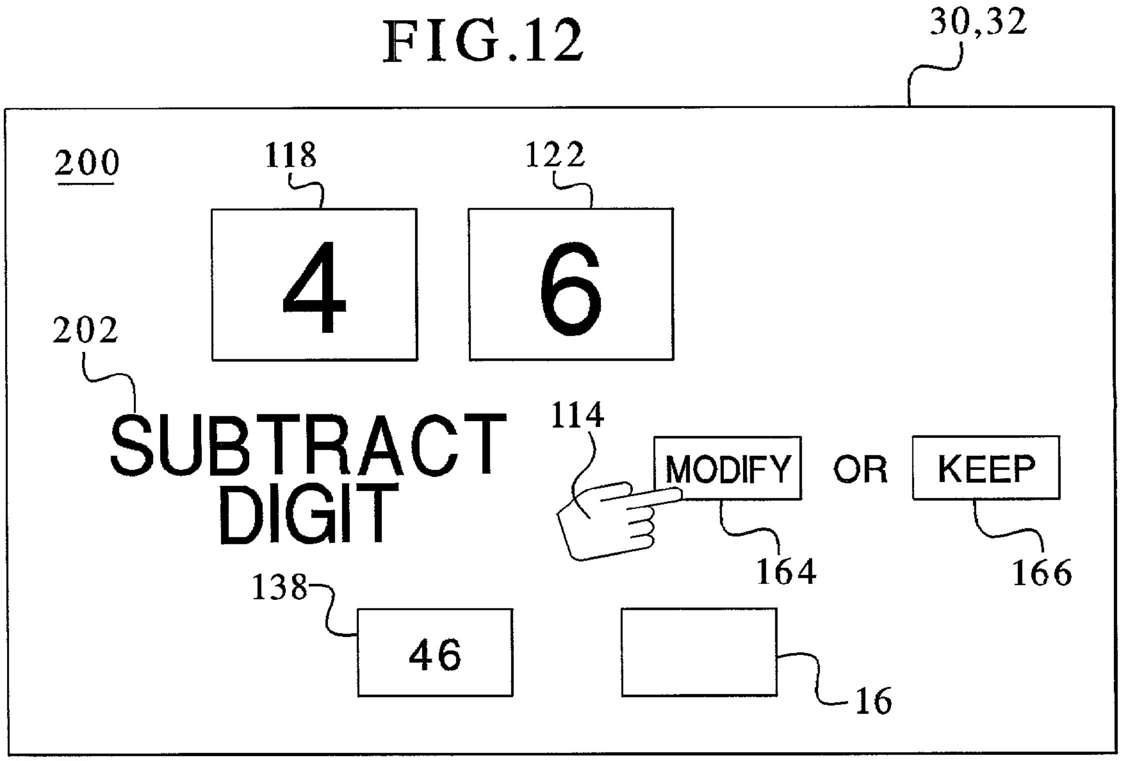
FIG. 12 is a front elevation view of one of the display devices illustrating the subtract digit modification method of the present invention.

Referring now to FIG. 12, a screen 200 displays the subtract digit modification option method of the present invention, wherein one of the display devices 30 or 32 displays the award of 416 in the positions or digits 118 through 122. It should be appreciated that the subtract digit option of the present invention may be an option for the bonus and base game embodiments disclosed above in connection with the player selectable awards.

The game provides the subtract digit method to the player according to a predefined or varying probability stored in the memory device 40. Since the subtract digit method changes the order of magnitude of the player's award (i.e., the number of digits in the award) and can only decrease the original award, this method is infrequently generated. The game can alternatively predefine this option to result from the occurrence of some game event, such as a particular combination of slot symbols, face cards or other event.

The subtract digit method removes a digit from the player's original award, e.g., the new award has two out of the three original numbers in the same order as the old award. The subtract digit method in one embodiment includes eliminating the lowest number from the original award. The subtract digit method may however be adapted to randomly eliminate any number from the original award. The actual number eliminated has less significance than the fact that the player's award is losing an order of magnitude. It can be seen that this option is highly undesirable for the player.

In the screen 200 of FIG. 12, when the player 114 selects the modify input 164, the game displays a suitable symbol or message 202 indicating that the subtract digit modification method has been generated. The game thereafter subtracts a number (here, the lowest number). The game eliminates the number one displayed by the former position 120 (FIG. 8) and displays the new award of 46, which is the combination of the numbers displayed by the remaining positions 118 and 122. The new award is in one embodiment immediately downloaded to the paid display 138. In an alternative embodiment, the game may be adapted to repeat the entire option processes a predetermined number of times.

In another alternative embodiment, gaming device 10 automatically and randomly (as opposed to an option) subtracts a digit from the player's award. Gaming device 10, for example, may be adapted to subtract a digit upon the player's placement of a masked number 116 (FIGS. 3A and 3B) or selection of a digit, e.g., digits 118 through 122 (FIGS. 3C and 3D).

Figure 13:
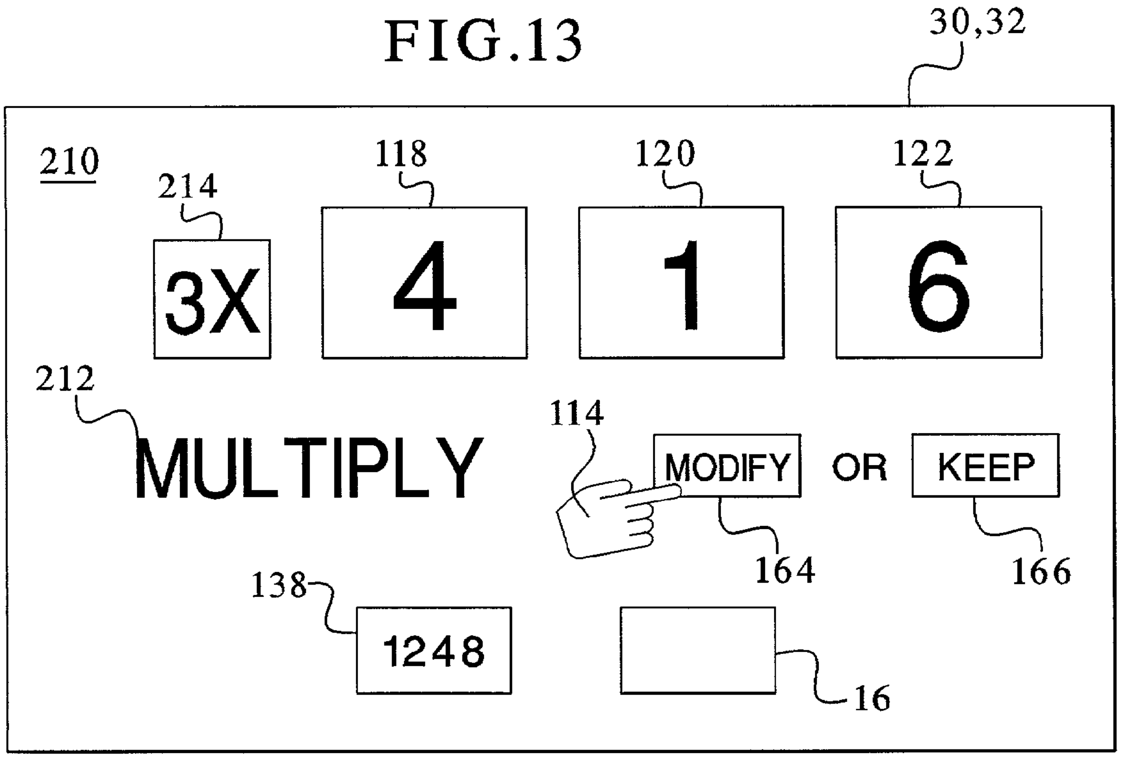
FIG. 13 is a front elevation view of one of the display devices illustrating the multiply modification method of the present invention.

Referring now to FIG. 13, a screen 210 displays the multiply modification option of the present invention, wherein one of the display devices 30 or 32 displays the award of 416 in the positions or digits 118 through 122. It should be appreciated that the multiply option of the present invention may be an option for the bonus and base game embodiments disclosed above in connection with the player selectable awards.

The game provides the multiply method to the player according to a predefined or varying probability stored in the memory device 40. Since the multiply method may change the order of magnitude of the player's award and can only increase the original award, this method is intermediately generated. The game can alternatively predefine this option to result from the occurrence of some game event, such as a particular combination of slot symbols, face cards or other event.

The multiply method generates a multiplier and multiplies this number by the player's original award to form a new award. The multiply method in one embodiment includes randomly generating either a 2× or a 3× multiplier. The multiply method may however be adapted to randomly generate any multiplier from a weighted or non-weighted table of multipliers. It can be seen that this option is desirable for the player.

In the screen 202 of FIG. 13, when the player 114 selects the modify input 164, the game displays a suitable symbol or message 212 indicating that the multiply modification method has been generated. The game thereafter generates a multiplier (here, a 2× or 3× multiplier), and thereby multiplies the original award. The game generates a 3× multiplier 214 and multiplies the original award of 416 by three. The result of 1248 is displayed by and downloaded to the paid display 138. In an alternative embodiment, the game may be adapted to display the product in another area of the screen 210, not download the result to the paid display 138 and repeat the entire option processes a predetermined number of times.

In another alternative embodiment, gaming device 10 automatically and randomly (as opposed to an option) multiplies the player's award. Gaming device 10, for example, may be adapted to multiply the player's award upon the placement of a masked number 116 (FIGS. 3A and 3B) or selection of a digit, e.g., digits 118 through 122 (FIGS. 3C and 3D). In such a case, the player places an additional masked number 116 or reselects a digit, so as not to replace a digit or order of magnitude of the award with a multiplier.

While the present invention is described in connection with what is presently considered to be the most practical and preferred embodiments, it should be appreciated that the invention is not limited to the disclosed embodiments, and is intended to cover various modifications and equivalent arrangements included within the spirit and scope of the claims. Modifications and variations in the present invention may be made without departing from the novel aspects of the invention as defined in the claims, and this application is limited only by the scope of the claims.

The invention is claimed as follows:

1. A gaming device comprising:

a display device;

an original award having a plurality of digits displayed by the display device, said original award resulting from a gaming event played by a player and wherein the digits indicate an amount of the original award;

a plurality of different award modification methods, wherein a first one of the award modification methods includes individually adding a digit to the digits of the original award, and wherein a second one of the award modification methods includes rearranging the digits of the original award; and a processor which communicates with the display device, which determines whether to modify said original award and, if the determination is made to modify said original award, (a) selects one of the plurality of different award modifications methods, (b) causes said selected award modification method to modify said digits of the original award, (c) causes the display device to display said modified digits and (d) provides a modified award to a player wherein the modified digits indicate the amount of the modified award.

2. The gaming device of claim 1, which includes a modify input which communicates with the processor, wherein the determination of whether to modify said original award is based on a player's selection of the modify input.

3. The gaming device of claim 1, wherein the processor determines to modify said original award when an expected value associated with the digits in the original award exceeds the original award.

4. The gaming device of claim 1, wherein the processor randomly determines to modify said original award based on a probability stored in a memory device accessed by the processor.

5. The gaming device of claim 1, wherein the gaming event includes a plurality of player selectable positions displayed by the display device, wherein the processor enables the player to select the positions, associates digits with the player's selection of the positions and determines the original award based on an order of the digits associated with the positions.

6. The gaming device of claim 1, wherein the gaming event includes a plurality of masked digits displayed by the display device, wherein the processor enables the player to arrange at least two of the masked digits in an order, and the original award is based on the order of the masked digits arranged by the player.

7. The gaming device of claim 1, wherein the gaming event includes a plurality of selections displayed by the display device, wherein the processor associates digits with said selections, and which enables a player to associate selections with a one's digit, a ten's digit and a hundred's digit of the original award provided to the player.

8. A gaming device comprising:

a display device;

an original award having a plurality of digits displayed by the display device, said original award resulting from a gaming event played by a player and wherein the digits indicate an amount of the original award; and a processor which communicates with the display device, which adds a new digit to the digits of the original award, displays a new award including said new digit and provides the new award to a player, wherein the digits of the original award and the new digit indicate the amount of the new award.

9. The gaming device of claim 8, wherein said addition of said digit is one of a plurality of modifiers of said digits.

10. The gaming device of claim 9, which includes a modify input which communicates with the processor, wherein the new digit is added to the original award upon a player's selection of the modify input.

11. The gaming device of claim 8, wherein the processor randomly determines to when add a new digit to the original award based on a probability stored in a memory device accessed by the processor.

12. The gaming device of claim 8, wherein the gaming event includes a plurality of player selectable positions displayed by the display device, wherein the processor enables the player to select the positions, associates digits with the player's selection of the positions and which determines the original award based on an order of the digits associated with the positions.

13. The gaming device of claim 8, wherein the gaming event includes a plurality of masked digits displayed by the display device, wherein the processor enables the player to arrange at least two of the masked digits in an order, and the original award is based on the order of the masked digits arranged by the player.

14. The gaming device of claim 8, wherein the gaming event includes a plurality of selections displayed by the display device, wherein the processor associates digits with said selections, and which enables a player to associate selections with a one's digit, a ten's digit and a hundred's digit of the original award provided to the player.

15. A gaming device comprising:

a display device;

an original award having a plurality of digits displayed by the display device, said original award resulting from a gaming event played by a player and wherein the digits indicate an amount of the original award; and a processor which communicates with the display device, which removes a digit from the digits of the original award, displays a new award without the removed digit and provides the new award to a player, wherein the digits of the original award with the digit removed indicate the amount of the new award.

16. The gaming device of claim 15, wherein said removal of said digit is one of a plurality of modifiers of said digits.

17. The gaming device of claim 16, which includes a modify input which communicates with the processor, wherein the digit is removed from the original award upon a player's selection of the modify input.

18. The gaming device of claim 15, wherein the processor randomly determines when to remove the digit from the original based on a probability stored in a memory device accessed by the processor.

19. The gaming device of claim 15, wherein the gaming event includes a plurality of player selectable positions displayed by the display device, wherein the processor enables the player to select the positions, associates digits with the player's selection of the positions and determines the original award based on an order of the digits associated with the positions.

20. The gaming device of claim 15, wherein the gaming event includes a plurality of masked digits displayed by the display device, wherein the processor enables the player to arrange at least two of the masked digits in an order, and the original award is based on the order of the masked digits arranged by the player.

21. The gaming device of claim 15, wherein the gaming event includes a plurality of selections displayed by the display device, wherein the processor associates digits with said selections, and which enables a player to associate selections with a one's digit, a ten's digit and a hundred's digit of the original award provided to the player.

22. A gaming device comprising:

a display device;

a processor that communicates with the display device;

an original award including a plurality of digits displayed by the display device, said original award resulting from a gaming event played by a player and wherein the digits indicate an amount of the original award;

a plurality of different award modification methods which are adapted to modify at least one of the digits of the original award, wherein a first one of the award modification methods includes individually adding a digit to the digits of the original award, and wherein a second one of the award modification methods includes rearranging the digits of the original award; and a player selectable modify input which communicates with the processor, an activation of which initiates one of the award modification methods selected from the plurality of award modification methods.

23. The gaming device of claim 22, wherein the rearranged digits indicate an amount of a modified award.

24. The gaming device of claim 22, wherein a third one of the award modification methods includes an award regeneration from numbers used to form the original award, wherein the regenerated numbers indicate an amount of a modified award.

25. The gaming device of claim 22, whereinthe digits of the original award and the new digit indicate an amount of a modified award.

26. The gaming device of claim 22, wherein a third one of the award modification methods includes removing a digit from the original award, wherein the digits of the original award with the digit removed indicate an amount of a modified award.

27. The gaming device of claim 22, wherein a third one of the award modification methods includes multiplying the original award by a number, wherein a product of the multiplication results in a modified award.

28. A gaming device comprising:

a display device;

an original award including a plurality of digits displayed by the display device, said original award resulting from a gaming event played by a player and wherein the digits indicate an amount of the original award;

a plurality of different award modification methods which are adapted to modify at least one of the digits of the original award, wherein a first one of the award modification methods includes individually adding a digit to the digits of the original award, and wherein a second one of the award modification methods includes rearranging the digits of the original award; and a processor that communicates with the display device and randomly initiates one of the modification methods selected from the plurality of modification methods.

29. A gaming device operated under the control of a controller, said gaming device comprising:

a display device;

an original award represented by a plurality of individual digits displayed by the display device, said original award resulting from a gaming event played by a player and wherein the digits indicate an amount of the original award; and a final award provided to a player, said final award including a modification of the digits of the original award displayed by the display device, wherein the modified digits of the original award indicate an amount of the final award and wherein the modification method for modification of the original award is selected from a plurality of different award modification methods stored by the controller and including at least: a rearrangement of at least two of the digits of the original award, an addition of a digit to the digits of the original award, a removal of one of the digits of the original award, and a modification of at least one of the digits of the original award.

30. The gaming device of claim 29, wherein the modification of the digits of the original award is randomly determined.

* * * * *